(12) United States Patent
Dhanuka et al.

(10) Patent No.: US 11,893,338 B2
(45) Date of Patent: *Feb. 6, 2024

(54) MERGING SELECTED DIGITAL POINT TEXT OBJECTS

(71) Applicant: Adobe Inc., San Jose, CA (US)

(72) Inventors: Praveen Kumar Dhanuka, Howrah (IN); Arushi Jain, Delhi (IN); Matthew Fisher, San Francisco, CA (US)

(73) Assignee: Adobe Inc., San Jose, CA (US)

( * ) Notice: Subject to any disclaimer, the term of this patent is extended or adjusted under 35 U.S.C. 154(b) by 294 days.

This patent is subject to a terminal disclaimer.

(21) Appl. No.: 17/388,744

(22) Filed: Jul. 29, 2021

(65) Prior Publication Data

US 2021/0357574 A1 Nov. 18, 2021

Related U.S. Application Data

(63) Continuation of application No. 16/745,210, filed on Jan. 16, 2020, now Pat. No. 11,106,858.

(51) Int. Cl.
*G06F 40/109* (2020.01)
*G06T 11/20* (2006.01)
*G06F 40/166* (2020.01)

(52) U.S. Cl.
CPC .......... *G06F 40/109* (2020.01); *G06F 40/166* (2020.01); *G06T 11/203* (2013.01)

(58) Field of Classification Search
CPC ...... G06F 40/109; G06F 40/166; G06F 3/048; G06F 3/0481; G06F 3/0484
See application file for complete search history.

(56) References Cited

U.S. PATENT DOCUMENTS

| 4,723,209 | A | * | 2/1988 | Hernandez | ............ | G06F 40/189 |
| | | | | | | 345/636 |
| 5,768,490 | A | | 6/1998 | Hersch et al. | | |
| 5,832,530 | A | | 11/1998 | Paknad et al. | | |
| 7,171,621 | B1 | | 1/2007 | Johns et al. | | |

(Continued)

OTHER PUBLICATIONS

VectorFirstAid Plugin: https://astutegraphics.com/plugins/vectorfirstaid; date downloaded Mar. 25, 2020.

(Continued)

*Primary Examiner* — Wilson W Tsui
(74) *Attorney, Agent, or Firm* — Keller Preece PLLC

(57) ABSTRACT

The present disclosure relates to systems, methods, and non-transitory computer-readable media that merge separate digital point text objects into a single merged digital text object while preserving the properties and original visual appearance associated with the digital text included therein. For example, the disclosed systems can determine point text character properties associated with the separate digital point text objects (e.g., rotations, baseline shifts, etc.). The disclosed systems can merge the separate digital point text objects into a single merged digital point text object and modify associated font character properties to reflect the determined point text character properties. Further, the disclosed systems can generate an area text object based on the merged digital point text object where the area text object includes the digital text and the font character properties.

20 Claims, 23 Drawing Sheets

(56) References Cited

U.S. PATENT DOCUMENTS

| | | | |
|---|---|---|---|
| 7,676,743 B2 | 3/2010 | Seeler | |
| 8,209,600 B1 | 6/2012 | Koh et al. | |
| 8,515,176 B1 | 8/2013 | Sankaranarayanan et al. | |
| 9,001,126 B2 * | 4/2015 | Burago | G06T 11/203 345/441 |
| 9,367,736 B1 | 6/2016 | Senechal et al. | |
| 9,619,435 B2 | 4/2017 | Wendt | |
| 9,888,147 B2 | 2/2018 | Tsutsumi | |
| 2002/0102022 A1 | 8/2002 | Ma et al. | |
| 2004/0117737 A1 * | 6/2004 | Bera | G06F 40/103 715/255 |
| 2004/0205568 A1 | 10/2004 | Breuel et al. | |
| 2006/0005151 A1 * | 1/2006 | Altman | G06F 40/166 715/860 |
| 2008/0238927 A1 * | 10/2008 | Mansfield | G06T 11/60 345/467 |
| 2009/0304283 A1 | 12/2009 | Predovic et al. | |
| 2010/0208303 A1 * | 8/2010 | Itami | G06T 1/00 358/1.18 |
| 2012/0151312 A1 | 6/2012 | Clee et al. | |
| 2013/0104037 A1 | 4/2013 | Doan et al. | |
| 2013/0205200 A1 | 8/2013 | Lazarevic et al. | |
| 2013/0275401 A1 | 10/2013 | Auger et al. | |
| 2019/0129940 A1 * | 5/2019 | Hewitt | G06N 5/02 |

OTHER PUBLICATIONS

Title: "Did You Know: One Text Block from Many", published: Feb. 2012, pp. 1-6, URL: http://vectips.com/tips-and-tricks/ did-you-know-one-text-block-from-many/ (Year: 2012).

U.S. Appl. No. 16/745,210, Mar. 4, 2021, Office Action.

U.S. Appl. No. 16/745,210, Jun. 29, 2021, Notice of Allowance.

\* cited by examiner

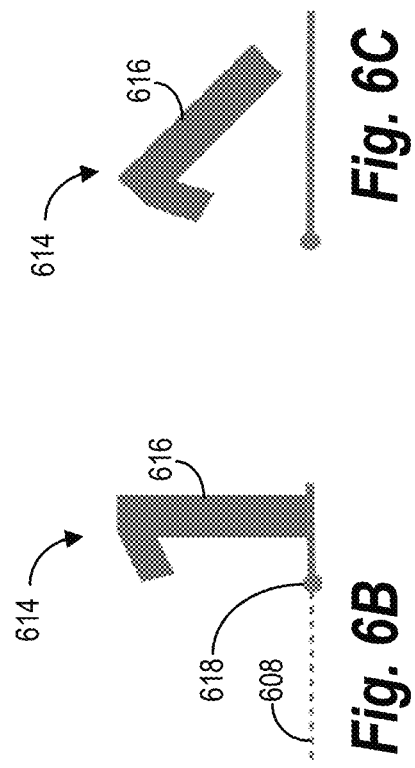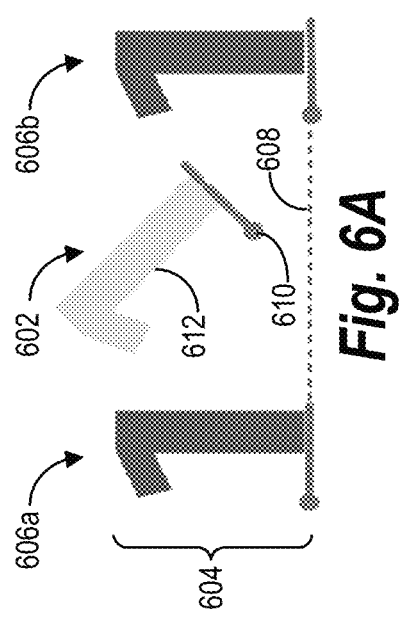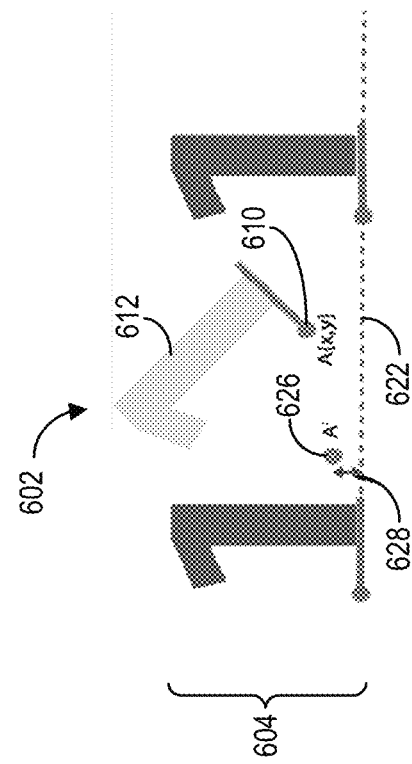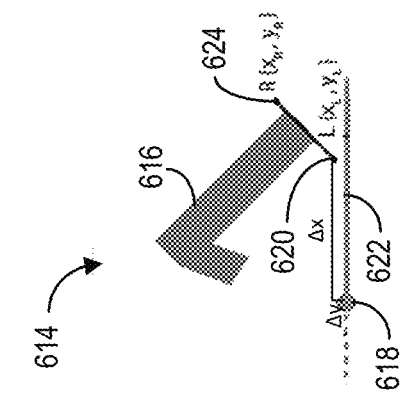

You may have been taught to indent each paragraph by hitting the spacebar five times. Back in the days of typewriters [Editor's note: You don't have to make us sound that old, Jack!] this was sound advice; five blank spaces would pretty reliably produce a half-inch indentation. That's because typewriters used fixed-width fonts, meaning that every character—whether a narrow letter like a capital I or a wide letter like a capital W—occupies the exact same space on the typed page. } 1004

One of the innovations of word processing software is kerning, which fits wide and narrow letters together more naturally. As a result, different fonts of the same size will display quite differently on the page. As you can see on your screen right now, a snippet of text occupies different volumes of space when it's kerned.

You may have been taught to indent each paragraph by hitting the spacebar five times. Back in the days of typewriters [Editor's note: You don't have to make us sound that old, Jack!] this was sound advice; five blank spaces would pretty reliably produce a half-inch indentation. That's because typewriters used fixed-width fonts, meaning that every character—whether a narrow letter like a capital I or a wide letter like a capital W—occupies the exact same space on the typed page. } 1008 } 1004

One of the innovations of word processing software is kerning, which fits wide and narrow letters together more naturally. As a result, different fonts of the same size will display quite differently on the page. As you can see on your screen right now, a snippet of text occupies different volumes of space when it's kerned.

Vertical Area Text Object 1506

Lorem ipsum dolor sit
amet consectetuer
adipiscing elit sed

↑

Vertical Merged Digital Point Text Object 1504

Lorem ipsum dolor sit
amet consectetuer
adipiscing elit sed

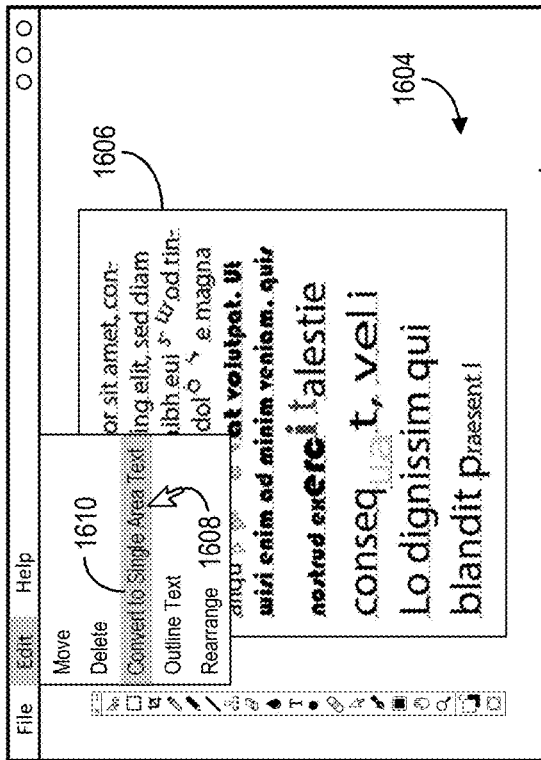
*Fig. 16A*
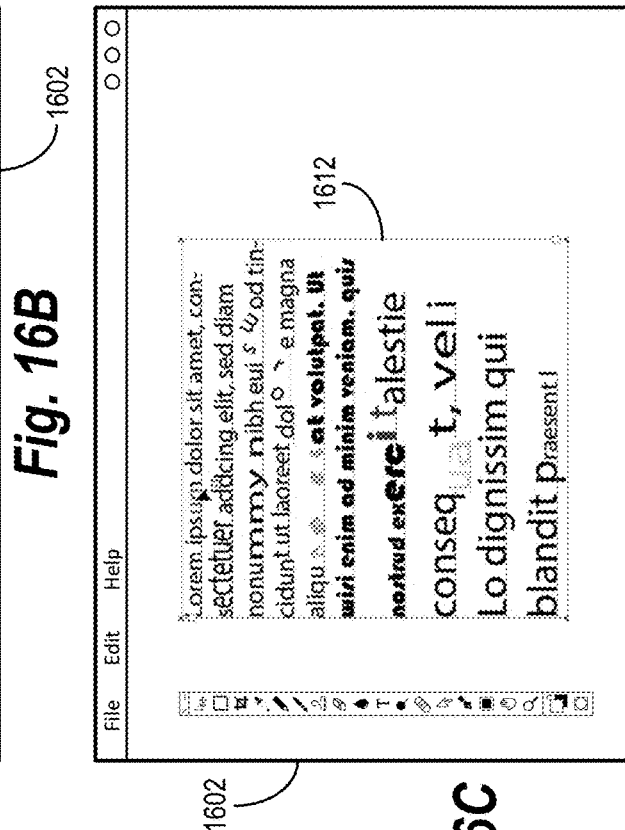
*Fig. 16B*
*Fig. 16C*

MERGING SELECTED DIGITAL POINT TEXT OBJECTS

CROSS-REFERENCE TO RELATED APPLICATIONS

The present application is a continuation of U.S. application Ser. No. 16/745,210, filed on Jan. 16, 2020. The aforementioned application is hereby incorporated by reference in its entirety.

BACKGROUND

Recent years have seen significant improvements in hardware and software platforms for designing, generating, and editing digital text. For example, conventional systems can import, to one computing device, digital text that was generated on another computing device for collaboration with other users on the editing of the digital text of a digital document. Conventional systems often compensate for the differences in text editing or formatting properties by importing the digital text within a plurality of digital point text objects (i.e., unbounded digital text objects) in an effort to preserve the overall layout of the original text. Although conventional systems can allow for the importation of digital text, such systems often fail to flexibly retain properties associated with the digital text leading to an inaccurate portrayal of the visual appearance of the digital text, inflexible editability, and inefficiencies in recreating the visual appearance.

These, along with additional problems and issues, exist with regard to conventional text editing systems.

SUMMARY

One or more embodiments described herein provide benefits and/or solve one or more of the foregoing or other problems in the art with systems, methods, and non-transitory computer-readable media that determine properties of digital text for merging digital point text objects to provide an accurate visual presentation of the digital text. For instance, the disclosed systems can preserve the visual appearance of digital text along with detecting and creating multiple paragraphs in a single merged area text object. Moreover, the disclosed systems can identify significant character and paragraph properties, such as rotation, baseline shift, and indentation, and generate an area text object that preserves these character and paragraph properties. Furthermore, the disclosed systems can preserve frame orientation of horizontal or vertical digital text in generating area text objects from imported digital text.

For example, in one or more embodiments, the disclosed systems analyze digital text represented in a plurality of separate digital point text objects (e.g., that result from importing the digital text) to detect character properties associated with the digital text (e.g., associated with the digital point text objects). The disclosed systems can merge the separate digital point text objects into a single digital point text object that includes the digital text and further apply corresponding character properties (e.g., associated with the digital characters themselves) to the digital text. Additionally, the disclosed systems can convert the single digital point text object into an area text object that includes the digital text and the corresponding character properties. In some embodiments, the disclosed systems further modify or replace one or more of the corresponding character properties when generating the area text object in order to simplify the character properties applied to the digital text therein. In this manner, the disclosed systems can flexibly and efficiently generate area text objects for digital text while allowing for flexible editability and an accurate visual presentation.

Additional features and advantages of one or more embodiments of the present disclosure are outlined in the following description.

BRIEF DESCRIPTION OF THE DRAWINGS

This disclosure will describe one or more embodiments of the invention with additional specificity and detail by referencing the accompanying figures. The following paragraphs briefly describe those figures, in which:

FIGS. 6A-6E illustrate diagrams for determining a point text rotation associated with a digital point text object in accordance with one or more embodiments;

FIGS. 10A-10B illustrate diagrams for determining a vertical shift associated with a text line of digital text in accordance with one or more embodiments;

FIG. 15 illustrates a block diagram for generating vertical merged digital text objects that include vertical digital text in accordance with one or more embodiments;

FIGS. 16A-16C illustrate a user interface used by the merged text object generation system in accordance with one or more embodiments;

DETAILED DESCRIPTION

Figure 1:
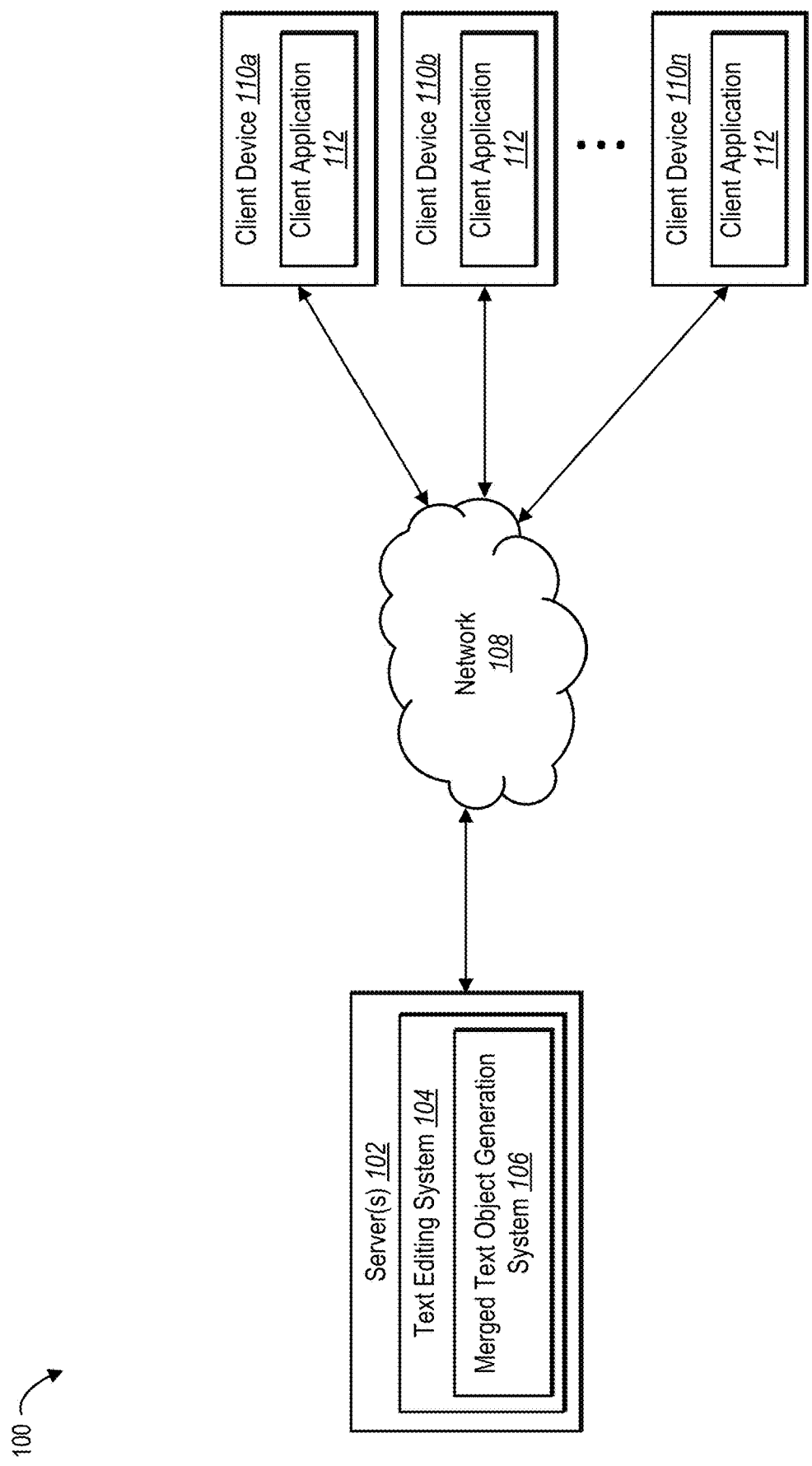
FIG. 1 illustrates an example environment in which a merged digital text object generation system can operate in accordance with one or more embodiments.

One or more embodiments described herein include a merged text object generation system for generating a merged digital text object based on individual point text objects while accurately preserving the visual appearance of the original digital text. For instance, the merged text object generation system can interactively and selectively convert point text objects into area text objects while preserving visual appearance in creating multiple paragraphs in a single block. Thus, the merged text object generation system can combine multiple small point text objects into an area text object with the full visual appearance intact. To illustrate, the merged text object generation system can robustly detect complex character and paragraph properties, such as baseline shift and rotation, and then merge the point text objects while preserving these complex characteristics. In doing so, the merged text object generation system can merge text blocks to form non-rectangular shapes while preserving visual appearance fidelity. Furthermore, the merged text object generation system can flexibly merge digital text into both horizontal and vertical area text objects.

To provide an example, in one or more embodiments, the merged text object generation system identifies a user selection of a plurality of digital point text objects in a digital document. The merged text object generation system determines point text character properties associated with digital text represented in the plurality of digital point text objects. Additionally, the merged text object generation system merges the plurality of digital point text objects to generate a merged digital point text object and modifies font character properties of the merged digital point text object to reflect the point text character properties. Based on the merged digital point text object, the merged text object generation system generates an area text object that includes the digital text and a set of font character properties that reflect the point text character properties.

As just mentioned, in one or more embodiments, the merged text object generation system determines point text character properties associated with digital text represented in a plurality of digital point text objects. In some embodiments, the plurality of digital point text objects corresponds to a user selection. For example, the merged text object generation system can import digital text from a digital document in the form of digital point text objects. The merged text object generation system can detect user selection of digital point text objects and analyze the selected digital point text objects to identify the associated point text character properties.

The merged text object generation system can determine a variety of point text character properties in order to generate area text objects that mirror the visual appearance of the original text. For instance, the merged text object generation system can identify a baseline shift associated with a digital point text object (e.g., a baseline shift that corresponds to a superscript or subscript in the digital text), a point text rotation of a digital point text object, a point text spacing between digital point text objects, a text line indent, a new line character, and/or a text line shift (e.g., a vertical text line shift) associated with a text line of the digital text represented in the plurality of digital point text objects.

As also mentioned, in one or more embodiments, the merged text object generation system merges the plurality of digital point text objects to generate a merged digital point text object. In particular, the merged digital point text object can include the digital text represented in the plurality of digital point text objects. In some embodiments, however, the merged text object generation system does not initially reflect the point text character properties (or, at least, all of the point text character properties) of the original text. In other words, the digital text within the merged digital point text object may not appear as it did within the plurality of digital point text objects.

In one or more embodiments, the merged text object generation system modifies font character properties of the merged digital point text object to reflect the identified point text character properties. In particular, the merged text object generation system determines font character properties that correspond to the point text character properties and modifies the digital text of the merged digital point text object based on the font character properties. For example, the merged text object generation system can modify the digital text of the merged digital point text object by vertically shifting a digital character within the merged digital point text object to reflect a baseline shift of a corresponding digital point text object. To provide another example, the merged text object generation system can modify the digital text by rotating a digital character within the merged digital point text object to reflect a point text rotation of a corresponding digital point text object. Thus, the merged text object generation system can restore, within the merged digital point text object, the appearance of the digital text reflected in the plurality of digital point text objects.

As further mentioned above, in one or more embodiments, the merged text object generation system generates an area text object based on the merged digital point text object. In particular, the area text object includes the digital text represented in the merged digital point text object. In one or more embodiments, the area text object further includes the font character properties that reflect the point text character properties. In one more embodiments, the merged text object generation system further modifies (e.g., formats) the digital text within the area text object based on point text paragraph properties associated with the digital text (e.g., justification or alignment properties, paragraph end points indicating how text lines are to be grouped into paragraphs, etc.).

In some embodiments, the merged text object generation system modifies or replaces, within the area text object, one or more of the font character properties (i.e., the modified font character properties) of the merged digital point text object to simplify the font character properties in the area text object. For example, the merged text object generation system can modify consistent text spacing within a text line by replacing the current text spacing values (e.g., one or more tab values or kerning values) with a text tracking value. In some embodiments, the merged text object generation system applies justification, spacing, and/or kerning in a prioritized manner to control visual appearance. In further embodiments, the merged text object generation system modifies or removes irregular kerning and spacing values to simplify font character properties of the area text object.

In one or more embodiments, the merged text object generation system modifies the digital text of the area text object based on user input. For example, the merged text object generation system can receive user edits to the digital text (e.g., via a user interface of a computing device) and modify the digital text of the area text object based on the user edits. In one or more embodiments, the user edits are directed toward a particular paragraph of the digital text. Accordingly, the merged text object generation system can modify the paragraph based on the user edits while maintaining the visual appearance of other paragraphs within the area text object.

The merged text object generation system can also generate area text objects with regard to horizontal or vertical text. For example, the merged text object generation system can generate area text objects from horizontal digital text (e.g., digital text having words that are spelled in a left-to-right or a right-to-left direction) or from vertical digital text (e.g., digital text having words that are spelled in a top-to-bottom or a bottom-to-top direction). Thus, the merged text object generation system can accommodate a variety of different languages or font styles, regardless of the direction of text entry.

As mentioned above, conventional text editing systems suffer from several technological shortcomings that result in inflexible, inaccurate, and inefficient operation. For example, conventional text editing systems are often inflexible in that they rigidly import digital text within a plurality of digital point text objects even where the digital text was generated within another type of text object (e.g., an area text object). As a consequence, such systems fail to flexibly retain properties (e.g., font character properties, such as character rotation) associated with imported digital text, replacing such properties by manipulating the digital point text objects themselves (e.g., modifying the point text character properties). Further, because the digital point text objects tend to maintain a fixed position within the digital document, conventional systems suffer from inflexible editability as modifying the digital text within a digital point text object often leads to overlapping digital characters and/or a change to the text layout.

Some conventional systems attempt to address these concerns by combining individual digital point text objects. However, such systems often fail to flexibly merge digital point text objects that are associated with point text rotation, a baseline shift, or vertical text. Indeed, such digital point text objects typically remain separated. Further, conventional systems often fail to flexibly merge digital point text objects that do not form a rectangular shape. Even where merging is successful, conventional text editing systems still fail to provide flexible editability as modifying the digital text in one paragraph may change the visual appearance of the other paragraphs of the single digital point text object.

In addition to flexibility concerns, conventional text editing systems are also inaccurate. Indeed, importing digital text within a plurality of digital point text objects provides an inaccurate representation of the digital text. By importing digital text within digital point text objects, such systems not only inaccurately represent digital text that was originally generated within an area text object, they further fail to accurately capture certain properties of the text layout, such as line breaks. Some conventional systems may enable a user to manually create an area text object within the digital document and copy-and-paste the digital text therein; however, because such systems typically fail to retain font character properties, conventional systems often fail to apply such properties to the digital text within the area text object. Therefore, the resulting digital text is not an accurate representation of the imported digital text (e.g., digital characters that were originally rotated will no longer be rotated, etc.)

In addition to problems with flexibility and inaccuracy, conventional text editing systems are often inefficient. As just mentioned, some conventional systems enable users to manually create an area text object that includes the digital text. Such systems, however, often require repeated user interactions via a user interface in order to create the area text object and copy-and-paste the digital text. Further, because the copied-and-pasted digital text will not be associated with the same font character properties associated with the imported digital text, such systems often require additional user interface interactions and wasted computer resources to modify the properties of the copied-and-pasted digital text to recreate the appearance of the imported digital text. Accordingly, such conventional systems often require a significant amount of computing resources (e.g., computing time and power), interface interaction, and time to recreate an area text object and the visual appearance of the included digital text.

The merged text object generation system provides several advantages over conventional systems. For example, the merged text object generation system can operate more flexibly than conventional systems. In particular, by determining font character properties that reflect the text point character properties of the digital point text objects, the merged text object generation system can flexibly restore the font character properties of imported the digital text. Additionally, the merged text object generation system can more flexibly merge digital point text objects that are associated with rotation, a baseline shift, or vertical text. Further, by generating an area text object that includes the digital text and associated font character properties, the merged text object generation system allows for flexible editing while avoiding the risk of changing the visual appearance of the digital text as a whole.

Additionally, the merged text object generation system can operate more accurately than conventional systems. Indeed, by generating an area text object and providing the digital text therein, the merged text object generation system provides a more accurate representation of imported digital text that was originally generated within an area text object. Further, by modifying the font character properties of the digital text of the merged digital point text object and including those font character properties within the area text object, the merged text object generation system provides a more accurate representation of imported digital text.

Further, the merged text object generation system can improve efficiency. Indeed, by generating an area text object that includes the digital text and font character properties, the merged text object generation system reduces the user interface interactions, time, number of steps, and computer resources required to recreate the area text object of the imported digital text (e.g., via a user interface). Similarly, by including the font character properties within the area text object, the merged text object generation system reduces the amount of computing time and power used to respond to user interface interactions for recreating those properties.

As mentioned above, the merged text object generation system operates with respect to digital text associated with a digital document. In one or more embodiments, a digital document includes an electronic file accessed by or accessible to a computer device. In some embodiments, a digital document includes an electronic file that contains digital text. To illustrate, a digital document can include a text document (e.g., a word processing document), a graphic design document, or even a digital image or digital video that includes digital text. In one or more embodiments, an imported digital document includes a digital document that was generated or modified by one computing device, but accessed by another computing device (e.g., the computing device implementing the merged text object generation system).

In one or more embodiments, digital text includes a digital representation of one or more digital characters. For example, digital text can include individual characters, words, punctuation marks, or other symbols that have been written, typed, drawn, or otherwise provided within a digital visual textual representation. To illustrate, digital text can include a digital textual representation of individual characters, words, punctuation marks, or other symbols within a digital document. In one or more embodiments, digital text can include vertical digital text. In particular, vertical digital text can include digital text having a vertical orientation where the digital characters form a vertical sequence of digital text. For example, vertical digital text can include digital text having words that are spelled from top-to-bottom or from bottom-to-top.

In one or more embodiments, digital text includes one or more text lines (also referred to as lines of text). In some embodiments, a text line includes a portion of digital text that appears in the same line of the digital text. For example, a text line can include individual characters, words, punctuation marks, or other symbols having the same or approximately the same (e.g., within a threshold) vertical position (or horizontal position with regard to vertical digital text) within a digital document. To illustrate, a text line can include a group of words positioned with respect to the same reference baseline in a digital document.

In one or more embodiments, a digital character includes a digital glyph. For example, a digital character can include a graphic symbol representing a single unit of digital text. To illustrate, a digital character can include a letter or other character that is readable or otherwise contributes to the meaning of digital text. But a digital character is not so limited. Indeed, a digital character can also include a punctuation mark, emoji, or other symbol within digital text.

As further mentioned above, the merged text object generation system generates one or more digital text objects. In one or more embodiments, a digital text object includes a digital object used for providing digital text within a digital document. For example, a digital text object can include a movable and/or expandable digital boundary in which digital text can be generated and/or displayed. To illustrate a digital text object can include a digital point text object or an area text object. In one or more embodiments, a vertical digital text object includes a digital text object in which vertical digital text can be entered (i.e., digital text can be entered in a sequence from top-to-bottom or from bottom-to-top). In one or more embodiments, a merged digital text object includes a digital text object generated based on a plurality of other digital text objects. For example, a merged digital text object can include a digital point text object or an area text object generated based on other digital text objects (e.g., individual digital point text objects).

In one or more embodiments, a digital point text object includes an unbounded digital text object. In particular, a digital point text object can include a digital text object in which point text (i.e., point type) can be entered and/or displayed. A digital point text object is often defined by an entry point for a character or line of text. Accordingly, text entered with regard to a digital point text object will generally continue in a straight line (because no bounding area will wrap the text to the next line). For example, a digital point text object can include a digital text object that expands or contracts automatically as digital text is entered or deleted, respectively. As mentioned above, a merged digital point text object can include a digital point text object generated based on a plurality of individual digital text objects (e.g., a plurality of digital point text objects).

In some embodiments, an area text object includes a bounded digital text object. Indeed, an area text object can include a digital text object in which area text (i.e., area type) can be entered and/or displayed. An area text object is often defined by an area within a digital document for entry of characters, lines, or paragraphs. Accordingly, when text entered with regard to an area text object reaches the boundaries of the defined area, the text will automatically wrap to the next line within the defined area. For example, an area text object can include a digital text object that is defined by a bounding box (i.e., an area text boundary box) and in which digital text is entered and/or displayed in accordance with the boundaries of the bounding box. Modifying the defined area of an area text object can modify the flow of text lines to fit within the newly defined boundaries.

In one or more embodiments, a point text character property includes a property or characteristic associated with a digital point text object (i.e., associated with the digital text included in the digital point text object). In particular, a point text character property can include a characteristic of a digital point text object that affects the appearance and/or position of the digital text included therein. To illustrate, a point text character property can include a baseline shift (i.e., a shift of a baseline of a digital point text object from a reference baseline established with regard to a text line that includes the digital point text object), a point text rotation (i.e., a rotation of a digital point text object), a point text spacing (i.e., a spacing between a given digital point text object and a preceding or following digital point text object in a text line), a text line indent applied to a digital point text object (i.e., a text line indent associated with a text line that includes the digital point text object), an indication that a digital point text object corresponds to the beginning of a new text line, or a vertical text line shift or horizontal text line shift associated with a text line.

In one or more embodiments, a font character property includes a property associated with a digital character. In particular, a font character property can include a characteristic of a digital character that affects the appearance and/or position of the digital character within an area text object. To illustrate, a font character property can include a vertical shift of a digital character (e.g., for horizontal digital text) or a horizontal shift of a digital character (e.g., for vertical digital text) from a baseline of an associated text line, a character rotation, a text spacing (e.g., a spacing between a final digital character of one word and an initial digital character of a following word), an indentation associated with (i.e., applied to) a digital character (i.e., an indentation associated with a text line that includes the digital character), a new line character associated with a digital character, or a vertical shift or horizontal shift associated with a text line. In one or more embodiments, a font character property associated with a digital character corresponds to (i.e., reflects) a point text character property associated with a digital point text object that includes that digital character. For example, the point text character property of an insertion point can correspond to a vertical shift of a font character property within a generated area text object.

Additional detail regarding the merged text object generation system will now be provided with reference to the figures. For example, FIG. 1 illustrates a schematic diagram of an exemplary system environment ("environment") 100 in which a merged text object generation system 106 can be implemented. As illustrated in FIG. 1, the environment 100 includes server(s) 102, a network 108, and client devices 110*a*-110*n*.

Although the environment 100 of FIG. 1 is depicted as having a particular number of components, the environment 100 can have any number of additional or alternative components (e.g., any number of servers, client devices, or other components in communication with the merged text object generation system 106 via the network 108). Similarly, although FIG. 1 illustrates a particular arrangement of the server(s) 102, the network 108, and the client devices 110*a*-110*n*, various additional arrangements are possible.

The server(s) 102, the network 108, and the client devices 110*a*-110*n* may be communicatively coupled with each other either directly or indirectly (e.g., through the network 108 discussed in greater detail below in relation to FIG. 18). Moreover, the server(s) 102 and the client devices 110*a*-110*n* may include a variety of computing devices (including one or more computing devices as discussed in greater detail with relation to FIG. 18).

As mentioned above, the environment 100 includes the server(s) 102. The server(s) 102 generates, stores, receives, and/or transmits data, including digital documents and digital text. For example, the server(s) 102 can receive digital text (e.g., receive a digital document containing the digital text) from one client device (e.g., the client device 110*a*) and transmit the digital text to another client device (e.g., the client device 110*b*). In one or more embodiments, the server(s) 102 comprises a data server. The server(s) 102 can also comprise a communication server or a web-hosting server.

As shown in FIG. 1, the server(s) 102 includes a text editing system 104. In particular, the text editing system 104 generates, accesses, displays, modifies formats, and/or edits digital text. For example, a client device can generate or otherwise access digital text (e.g., using the client application 112). Subsequently, the client device can transmit the digital text to the text editing system 104 hosted on the server(s) 102 via the network 108. The text editing system 104 can employ various methods to modify the digital text or provide various options by which a user of the client device can modify the segment of text. In some embodiments, the text editing system 104 is part of a digital document and/or digital image management system that can generate, modify, and/or create digital documents or digital images that include digital text objects.

Additionally, the server(s) 102 includes the merged text object generation system 106. In particular, in one or more embodiments, the merged text object generation system 106 utilizes the server(s) 102 to generate merged digital text object based on individual point text objects. For example, the merged text object generation system 106 uses the server(s) 102 to identify a plurality of digital point text objects that include digital text and generate an area text object that includes the digital text and font character properties.

For example, in one or more embodiments, the merged text object generation system 106, via the server(s) 102, identifies a user selection of a plurality of digital point text objects in a digital document. Via the server(s) 102, the merged text object generation system 106 determines point text character properties associated with digital text represented in the plurality of digital point text objects. Further, the merged text object generation system 106 merges the plurality of digital point text objects to generate a merged digital point text object and modifies font character properties of the merged digital point text object to reflect the point text character properties. Via the server(s) 102, the merged text object generation system 106 generates, based on the merged digital point text object, an area text object that includes the digital text and a set of font character properties that reflects the point text character properties.

In one or more embodiments, the client devices 110*a*-110*n* include computer devices that capable of generating, accessing, and/or editing digital text. For example, the client devices 110*a*-110*n* include smartphones, tablets, desktop computers, laptop computers, or other electronic devices. The client devices 110*a*-110*n* include one or more applications (e.g., the client application 112) that can generate, access, and/or edit digital text. For example, the client application 112 includes a software application installed on the client devices 110*a*-110*n*. Additionally, or alternatively, the client application 112 includes a software application hosted on the server(s) 102, which may be accessed by the client devices 110*a*-110*n* through another application, such as a web browser.

The merged text object generation system 106 can be implemented in whole, or in part, by the individual elements of the environment 100. Indeed, although FIG. 1 illustrates the merged text object generation system 106 implemented with regard to the server(s) 102, different components of the merged text object generation system 106 can be implemented in a variety of the components of the environment 100. For example, one or more components of the merged text object generation system 106—including all components of the merged text object generation system 106—can be implemented by a computing device (e.g., one of the client devices 110*a*-110*n*). Example components of the merged text object generation system 106 will be discussed in more detail below with regard to FIG. 16.

Figure 2A:
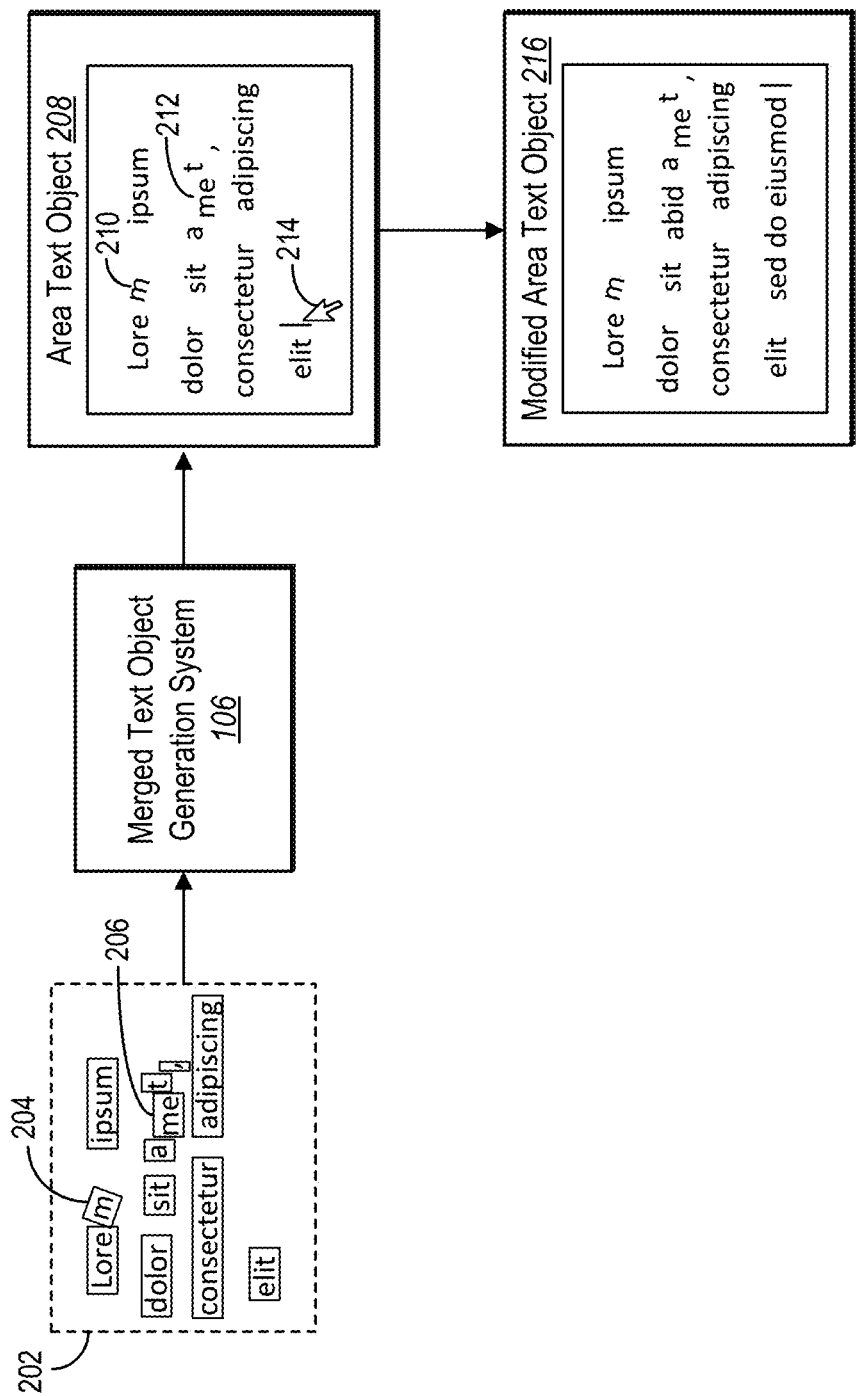
FIG. 2A illustrates a block diagram of a merged digital text object generation system generating an area text object based on a plurality of digital point text objects in accordance with one or more embodiments.

As mentioned above, the merged text object generation system 106 generates an area text object based on a plurality of digital point text objects (e.g., based on a merged digital point text object generated from the plurality of digital point text objects). FIG. 2A illustrates a block diagram of the merged text object generation system 106 generating an area text object in accordance with one or more embodiments.

As shown in FIG. 2A, the merged text object generation system 106 identifies a plurality of digital point text objects 202. In one or more embodiments, the merged text object generation system 106 identifies the plurality of digital point text objects 202 upon generation of the plurality of digital point text objects 202 within a digital document. In some embodiments, the merged text object generation system 106 identifies the plurality of digital point text objects 202 upon opening a digital document (e.g., importing a digital document) that includes the plurality of digital point text objects 202 (i.e., when the digital text is initially broken into separate digital point text objects). In still further embodiments, the merged text object generation system 106 identifies the plurality of digital point text objects 202 based on a user selection. For example, in one or more embodiments, the merged text object generation system 106 displays a digital document that includes the plurality of digital point text objects 202 on a user interface of a computer device (e.g., a client device accessing a server that hosts the merged text object generation system 106 or a computer device implementing the merged text object generation system 106). The merged text object generation system 106 can detect a user selection of the plurality of digital point text objects 202 via the user interface.

As further shown in FIG. 2A, the plurality of digital point text objects 202 include digital text. Further, the plurality of digital point text objects 202 (i.e., the digital text represented in the plurality of digital point text objects 202) are associated with point text character properties. As an illustration, the digital point text object 204 is associated with a point text rotation and the digital point text object 206 is associated with a modified vertical location of its insertion point. Additionally, as show in FIG. 2A, the plurality of digital point text objects 202 are organized into several text lines. However, each digital point text object represents a separate digital text object that can be manipulated without modifying the other digital point text objects.

Additionally, as illustrated in FIG. 2A, the merged text object generation system 106 generates an area text object 208 based on the plurality of digital point text objects 202. In one or more embodiments, the merged text object generation system 106 generates the area text object 208 based on a merged digital point text object resulting from merging (e.g., combining) the plurality of digital point text objects 202 as will be discussed in more detail below with regard to FIG. 3.

As shown in FIG. 2A, the area text object 208 includes the digital text represented in the plurality of digital point text objects 202. Further, the area text object 208 includes a set of font character properties that reflect the point text character properties associated with the plurality of digital point text objects 202. For example, the digital character 210 is associated with a character rotation that reflects the point text rotation associated with the digital point text object 204. Additionally, the pair of digital characters 212 are vertically shifted from the baseline of the associated text line to reflect the vertical position associated with the digital point text object 206. As illustrated in FIG. 2A, the digital text of the area text object 208 is organized similarly to the digital text represented in the plurality of digital point text objects 202.

Further, as shown in FIG. 2A, the merged text object generation system 106 can modify the area text object 208. Indeed, the merged text object generation system 106 can detect a user selection within the area text object 208 (e.g., via the cursor 214) and further detect user edits to the digital text within the area text object 208 (e.g., adding or deleting digital characters). Accordingly, the merged text object generation system 106 can modify the area text object 208 (as shown by the modified area text object 216. As shown in FIG. 2A, the modified area text object 216 includes the phrase "sed do eiusmod" added to the end of the digital text of the area text object 208. Further, the modified area text object 216 includes the phrase "abid" added at some point in the middle of the digital text of the area text object 208. In particular, the merged text object generation system 106 adds the phrase "abid" while preserving the overall layout of the digital text. Accordingly, the merged text object generation system 106 provides an improvement over many conventional systems, which would fail at preserving the overall layout when adding digital text (e.g., by causing the added digital text to overlap the following digital text).

Figure 2B:
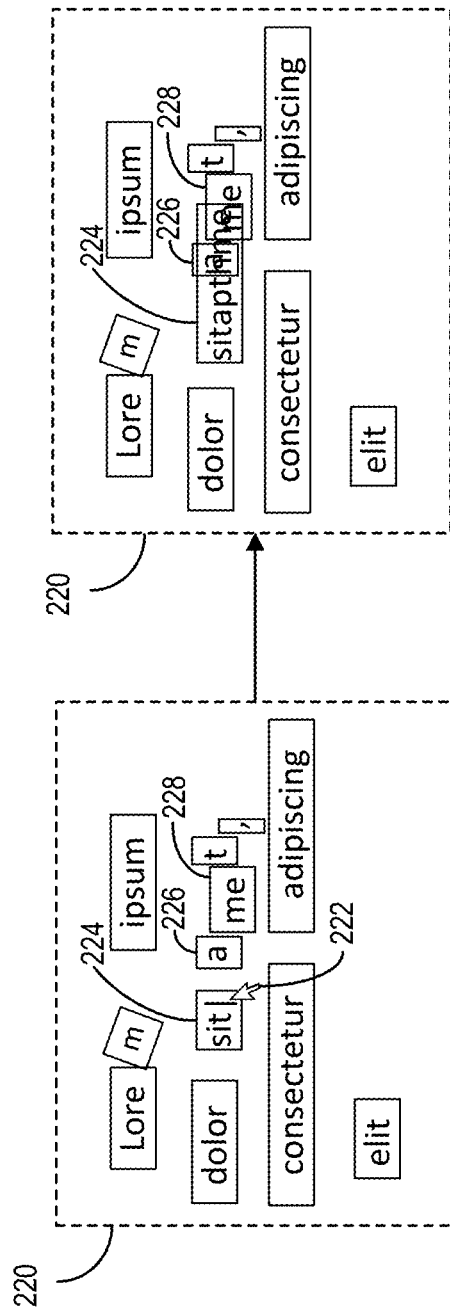
FIG. 2B illustrates a block diagram of overlapping digital text resulting from conventional methods of adding text to a digital point text object.

As an example, FIG. 2B illustrates a block diagram of overlapping digital text that results from methods of adding text employed by many conventional systems. As shown in FIG. 2B, a plurality of digital point text objects 220 include digital text. In particular, a digital point text object 224 precedes the digital point text objects 226, 228. A user may provide input related to adding digital text to the digital point text object 224 (e.g., via the cursor 222). As shown in FIG. 2B, because each digital point text object from the plurality of digital point text objects 220 is a separate and distinct digital text object, the added digital text causes the digital point text object 224 (and the included digital text) to overlap the digital point text objects 226, 228. As a result, the digital text becomes visually disorganized and difficult read.

Referring back to FIG. 2A, in one or more embodiments, the digital text within the area text object 208 includes multiple paragraphs of digital text (not shown). Further, the merged text object generation system 106 can receive user edits that target a particular paragraph of the digital text. In response, the merged text object generation system 106 can modify the targeted paragraph based on the user edits while maintaining the visual appearance of the other paragraphs. For example, the merged text object generation system 106 can maintain the overall layout of the digital text. Accordingly, the merged text object generation system 106 can operate more flexibly than conventional systems. Indeed, by modifying one paragraph while maintaining the visual appearance of the other paragraphs, the merged text object generation system 106 offers more flexible editability than conventional systems.

Figure 3:
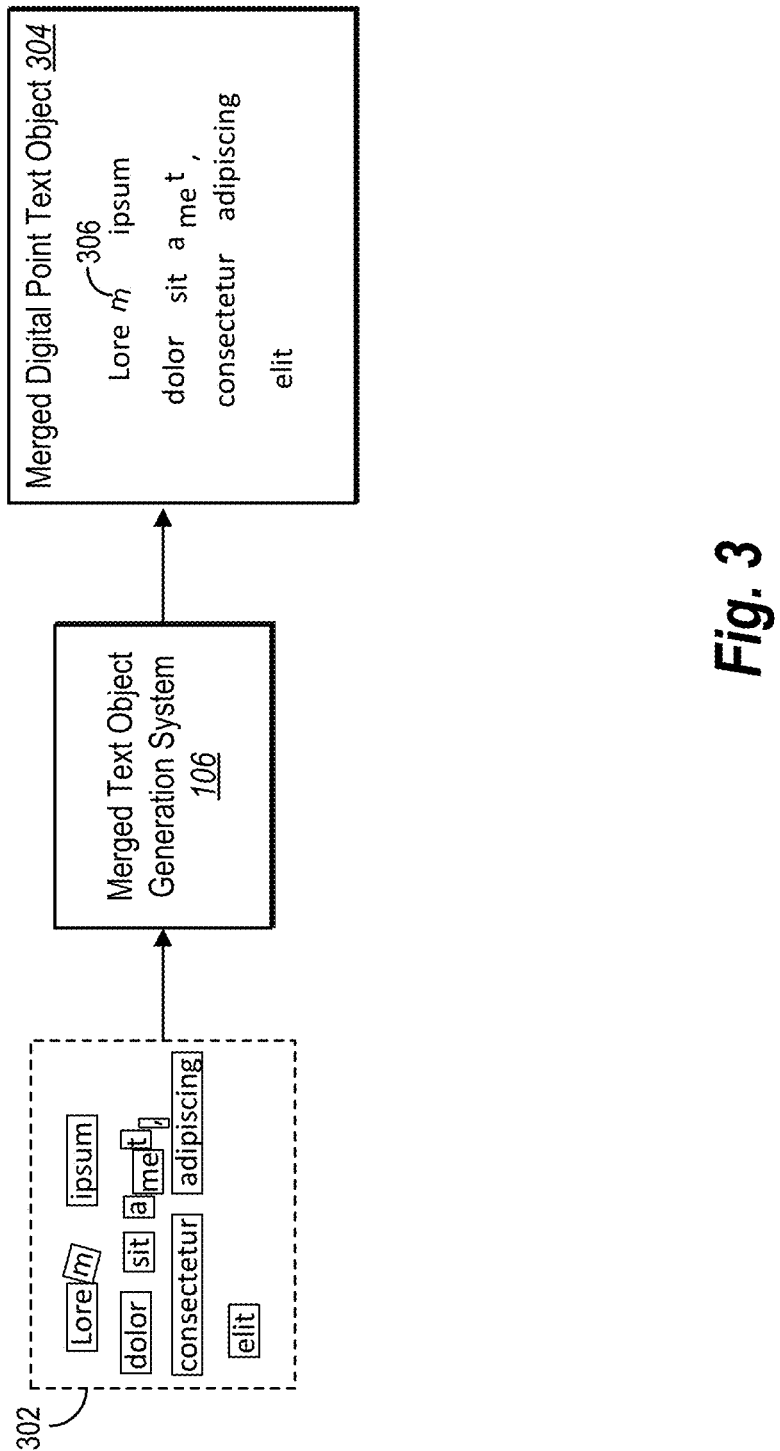
FIG. 3 illustrates a block diagram of generating a merged digital point text object based on a plurality of digital point text objects in accordance with one or more embodiments.

As mentioned above, the merged text object generation system 106 can generate a merged digital text object. FIG. 3 illustrates a block diagram of the merged text object generation system 106 generating a merged digital point text object in accordance with one or more embodiments. As shown in FIG. 3, the merged text object generation system 106 generates a merged digital point text object 304 based on a plurality of digital point text objects 302. In one or more embodiments, the merged text object generation system 106 generates the merged digital point text object 304 by merging or otherwise combining the plurality of digital point text objects 302. In some embodiments, however, the merged text object generation system 106 generates the merged digital point text object 304 as a new digital point text object based on the plurality of digital point text objects 302.

As illustrated by FIG. 3, the merged digital point text object 304 includes the digital text represented in the plurality of digital point text objects 302. Further, the merged digital point text object 304 includes font character properties that reflect the point text character properties associated with the digital text of the plurality of digital point text objects 302. Indeed, in one or more embodiments, the font character properties of the merged digital point text object 304 initially do not reflect the point text character properties when the merged text object generation system 106 generates the merged digital point text object 304 (e.g., the digital character 306 will not be rotated). Accordingly, the merged text object generation system 106 can modify the font character properties of the merged digital point text object 304 to reflect the point text character properties.

Indeed, in one or more embodiments, the merged text object generation system 106 can determine font character properties that reflect point text character properties associated with digital text represented in a plurality of digital point text objects. In particular, the merged text object generation system 106 can analyze the digital text represented in the plurality of digital point text objects and determine the point text character properties associated with the digital text (i.e., associated with the digital point text objects). The merged text object generation system 106 can determine font character properties that reflect those identified point text character properties and modify the font character properties of the merged digital point text object accordingly. FIGS. 4-10B illustrate diagrams of the merged text object generation system 106 determining point text character properties and modifying the font character properties of a merged digital point text object in accordance with one or more embodiments.

Figure 4:
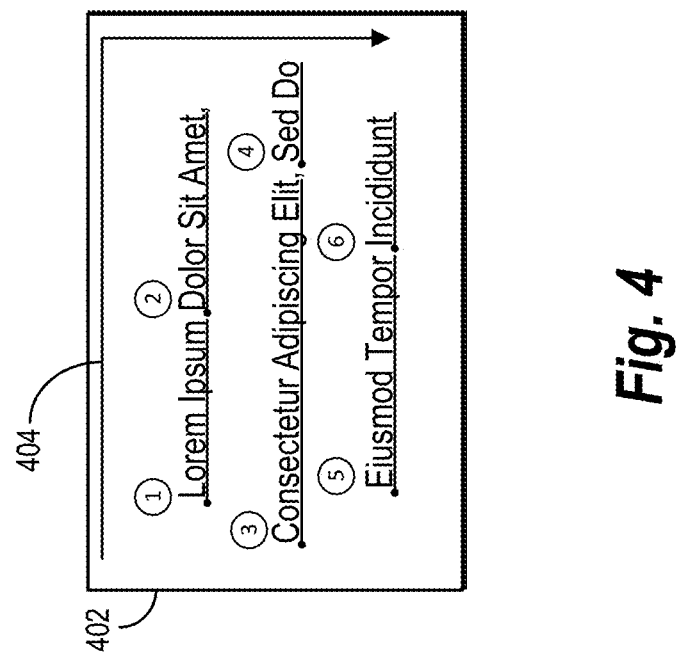
FIG. 4 illustrates a diagram for determining a text direction in accordance with one or more embodiments.

In particular, FIG. 4 illustrates a diagram of the merged text object generation system 106 sorting a plurality of digital point text objects 402 for analysis. Indeed, in one or more embodiments, the merged text object generation system 106 determines the point text character properties associated with the digital text of the plurality of digital point text objects 402 based on a sorted ordering of the included digital point text objects.

For example, in one or more embodiments, the merged text object generation system 106 constructs a list of the digital point text objects included in the plurality of digital point text objects 402. The merged text object generation system 106 further determines a text direction associated with the digital text represented in the plurality of digital point text objects 402. As an example, the arrow 404 of FIG. 4 represents a horizontal text direction that progresses from the top left of the digital text to the bottom right indicating that the digital text is read from left-to-right and the text lines form a sequence that progresses downward.

The merged text object generation system 106 sorts the digital point text objects within the list based on the text direction of the digital text. For example, for digital text having a horizontal text direction as shown in FIG. 4, the merged text object generation system 106 can sort a digital point text object that is further left in a text line higher than a digital point text object that is further right in the same text line. Where the horizontal positions of two digital point text objects are the same, the merged text object generation system 106 can sort a digital point text object from a text line that is further toward the top of the digital text higher than a digital point text object from a text line that is further toward the bottom of the digital text. In one or more embodiments, the merged text object generation system 106 utilizes the anchor points of the digital point text objects as a reference point for sorting. In other words, the merged text object generation system 106 can compare the positions of the digital point text objects based on the positions of their respective anchor points and sort the list of digital point text objects accordingly.

The algorithm presented below is another characterization of how the merged text object generation system 106 sorts a plurality of digital point text objects.

Algorithm
1. Get list of all the digital point text objects in the selection.
2. Sort( ) on the basis of text direction. Sort the digital point text objects on the basis of the position of their anchor point such that priority is given as follows:
   a. A left digital point text object is higher than a right digital point text object
   b. If the horizontal position for two digital point text objects is the same, give higher priority to the top digital point text object than then digital point text object below it.

While much of the remaining disclosure centers on those point text character properties discussed with reference to FIGS. 5-10B, it should be noted that the merged text object generation system 106 can further determine additional properties not discussed therein (whether associated with the digital point text objects themselves or directly associated with the included digital text). For example, in one or more embodiments, the merged text object generation system 106 further identifies a text style (e.g., the font style) and a text size (e.g., the font size) associated with digital text represented in a plurality of digital point text objects and modifies font character properties of the merged digital point text object to reflect those properties. In one or more embodiments, the merged text object generation system 106 determines the properties, such as the text style and the text size, before identifying the other point text character properties (e.g., those discussed with reference to FIGS. 5-10B) as such properties may affect the values of the other point text character properties. As an illustration, a point text spacing associated with digital point text objects may depend upon the size of the digital text included therein; therefore, failing to properly recognize the text size of the digital text could result in generating a text spacing that does not accurately reflect the point text spacing.

Figure 5A:
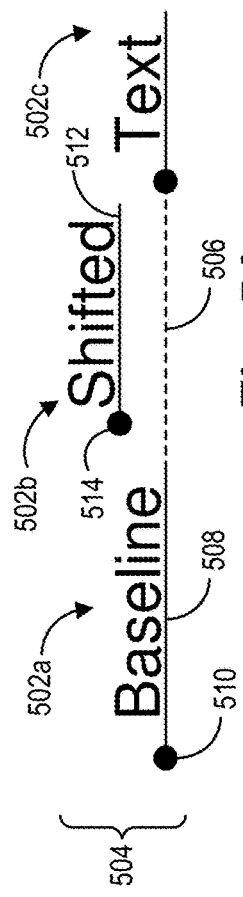
FIGS. 5A-5C illustrate diagrams for determining a baseline shift associated with a digital point text object in accordance with one or more embodiments.
Figure 5B:
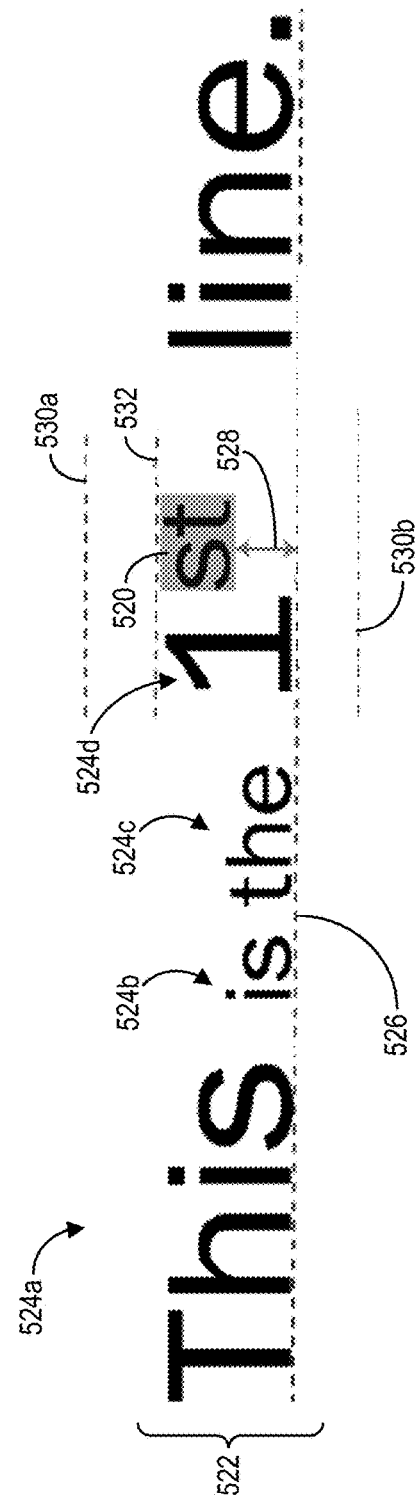
Figure 5C:
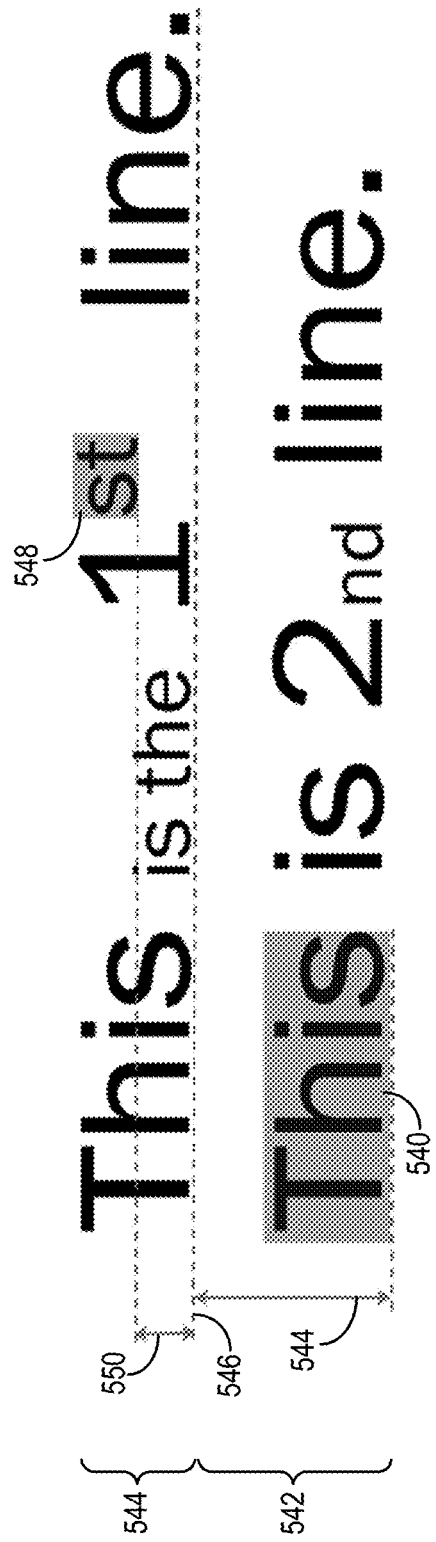

In one or more embodiments, the merged text object generation system 106 determines the point text character properties associated with the digital text reflected in the plurality of digital point text objects by determining a baseline shift associated with a digital point text object. FIGS. 5A-5C illustrate diagrams for determining a baseline shift associated with a digital point text object in accordance with one or more embodiments.

In one or more embodiments, the merged text object generation system 106 determines a baseline shift associated with a digital point text object based on a reference baseline associated with a text line that includes the digital point text object. FIG. 5A illustrates a diagram for determining a reference baseline in accordance with one or more embodiments. As shown in FIG. 5A, the text line 504 of digital text includes the digital point text objects 502a-502c.

In one or more embodiments, the merged text object generation system 106 determines the reference baseline 506 for the text line 504 based on the baseline 508 of the initial digital point text object of the text line 504 (i.e., the digital point text object 502a). For example, the merged text object generation system 106 can determine the reference baseline 506 to be an extension of the baseline 508 of the digital point text object 502a through the entirety of the text line 504. In some embodiments, the merged text object generation system 106 determines the baseline 508 of the digital point text object 502a based on the anchor point 510 of the digital point text object 502a. For example, the merged text object generation system 106 can determine the baseline 508 of the digital point text object 502a to include a line having the same vertical position as the anchor point 510 of the digital point text object 502a. Accordingly, in one or more embodiments, the merged text object generation system 106 determines the reference baseline 506 by identifying a vertical position of the anchor point 510 of the digital point text object 502a and establishing the reference baseline 506 as a line extending through the text line 504 and having the same vertical position as the anchor point 510 of the digital point text object 502a.

In one or more embodiments, the merged text object generation system 106 determines a baseline shift associated with the digital point text object 502b by identifying a vertical shift of a baseline 512 of the digital point text object 502b (e.g., of the anchor point 514) from the reference baseline 506. Though FIG. 5A illustrates a baseline shift in the positive direction (up), it should be noted that the merged text object generation system 106 can determine baseline shifts in the negative direction (down) as well.

Based on determining the baseline shift associated with the digital point text object 502b, the merged text object generation system 106 can modify font character properties of the merged digital point text object (i.e., the merged digital point text object 304) to reflect the baseline shift. In particular, the merged text object generation system 106 can modify the digital text of the merged digital point text object by vertically shifting, within the merged digital point text object, the digital characters associated with the digital point text object 502b based on the baseline shift.

In some instances, in determining the baseline shift of a digital point text object, the merged text object generation system 106 determines that the digital point text object is associated with the beginning of a new text line of the digital text. For example, in some embodiments, the merged text object generation system 106 determines that the vertical shift of a digital point text object is greater than a baseline tolerance threshold, indicating that the digital point text object belongs to a separate text line. FIG. 5B illustrates a diagram for determining a baseline tolerance threshold in accordance with one or more embodiments. In particular, FIG. 5B illustrates establishing a baseline tolerance threshold that corresponds to the digital point text object 520.

As shown in FIG. 5B, the merged text object generation system 106 determines the baseline tolerance for the digital point text object 520 based on the boundaries of the text line 522. The merged text object generation system 106 can determine the boundaries of the text line 522 based on the vertical boundaries of the digital point text objects 524a-524d (i.e., those preceding the digital point text object 520 in the text line 522). For example, the merged text object generation system 106 can determine the vertical boundaries based on the text heights associated with the digital text of the digital point text objects 524a-524c and the reference baseline 526 of the text line 522. To illustrate, the merged text object generation system 106 can identify the maximum height associated with the digital text of a given digital point text object as one vertical boundary of the digital point text object. Further, the merged text object generation system 106 can identify the reference baseline 526 as another vertical boundary of the digital point text object. In one or more embodiments, the merged text object generation system 106 identifies the boundaries of the text line 522 based on the maximum vertical boundaries of the digital point text objects 524a-524d. Thus, in one or more embodiments, the boundaries of the text line 522 can change depending on the font and/or font size of the digital text in the digital point text objects 524a-524d. In FIG. 5B, the boundaries of the text line 522 are represented by the boundary line 532 and the reference baseline 526.

In one or more embodiments, the merged text object generation system 106 further determines the vertical shift 528 between the digital point text object 520 and the reference baseline 526 of the text line 522. In one or more embodiments, the merged text object generation system 106 determines the baseline tolerance threshold as 1.5×VerticalShift if the vertical shift of the digital point text object 520 is positive and 0.5×VerticalShift if the vertical shift of the digital point text object 520 is negative. As shown in FIG. 5B, the merged text object generation system 106 can add the baseline tolerance thresholds 530a-530b to the boundaries of the text line 522.

As mentioned, the merged text object generation system 106 can utilize the baseline tolerance thresholds 530a-530b to determine whether a digital point text object is associated with a baseline shift or a new text line of the digital text. FIG. 5C illustrates a diagram for determining whether a digital point text object is associated with a new text line in accordance with one or more embodiments. In one or more embodiments, the merged text object generation system 106 determines that a digital point text object (e.g., the digital point text object 540) is associated with a new text line 542 if the vertical shift 544 associated with the digital point text object 540 exceeds the baseline tolerance threshold and is vertically below the reference baseline 546 of the current text line; otherwise, the merged text object generation system 106 determines that the digital point text object is associated with a baseline shift (e.g., the digital point text object 548 having a vertical shift 550 that is within the baseline tolerance threshold).

The algorithm presented below is another characterization of how the merged text object generation system 106 determines a baseline shift associated with a digital point text object. The algorithm further provides another characterization of how the merged text object generation system 106 determines whether a digital point text object is associated with a new text line of the digital text.

Algorithm
1. By considering the reference baseline of each text line to be the same as the baseline of the initial digital point text object in that text line, determine the baseline shift of all other digital point text objects in that text line with respect to the initial digital point text object in that text line.
2. For every text line, determine the reference baseline of that text line to be the vertical position of the anchor point of initial digital point text object of that text line.
3. For a given digital point text object evaluated based on the sorted order, compare the position of the anchor point of that digital point text object to the position of the anchor point of the previous digital point text object.
4. CurrentTextLineVerticalPosition=the vertical position of the initial digital point text object of the current text line.
5. Determine a baseline tolerance of the current text line:
    a. maxHeightTillNow=get the max vertical bounds of all the digital point text objects until now in the current text line
    b. Vertical Shift=get the vertical difference in the current digital point text object and CurrentTextLineVerticalPosition
    c. If it is a positive shift, BaselineTolerance=1.5*VerticalShift
    d. Else, BaselineTolerance=0.5*VerticalShift
6. Determine whether the current digital point text object of a text line based on the equivalence within the baseline tolerance
    a. If outside the tolerance region and vertically below CurrentTextLineVerticalPosition
        i. It is altogether a start of a new line
        ii. So, firstly, insert the content range of the current digital point text object into the area text followed by insertion of a newline character
    b. Else
        i. It is just a shift in the baseline of the digital point text object
        ii. So set this vertical shift to be the baseline shift of the content range of the current digital point text object when inserted into the area text.

In one or more embodiments, the merged text object generation system 106 determines the point text character properties associated with the digital text reflected in the plurality of digital point text objects by determining a point text rotation associated with a digital point text object. In one or more embodiments, the merged text object generation system 106 further determines a baseline shift that matches the point text rotation of the digital point text object. In other words, the merged text object generation system 106 can determine that a digital point object is associated with both a point text rotation and a baseline shift. FIGS. 6A-6E illustrate diagrams for determining a point text rotation associated with a digital point text object and a baseline shift that matches the point text rotation in accordance with one or more embodiments.

As shown in FIG. 6A, the merged text object generation system 106 identifies a digital point text object 602 that is associated with a point text rotation. In particular, the digital point text object 602 is included in a text line 604 that includes additional digital point text objects 606a-606b and is associated with a reference baseline 608. Additionally, the digital point text object 602 is associated with an anchor point 610 and includes the digital character 612 (i.e., the number '1').

As shown in FIG. 6B, the merged text object generation system 106 generates a duplicate point text object 614 corresponding to the digital point text object 602. As further shown, the merged text object generation system 106 positions the duplicate point text object 614 at the reference baseline 608 of the text line 604 (or at a corresponding reference baseline). Further, the merged text object generation system 106 populates the duplicate point text object 614 with a digital character 616 that corresponds to the digital character 612 reflected in the digital point text object 602. As further shown in FIG. 6B, the duplicate point text object 614 is associated with the anchor point 618.

In one or more embodiments, the merged text object generation system 106 generates the duplicate point text object 614 as part of the digital text that includes the digital point text object 602. For example, as mentioned, the merged text object generation system 106 can generate the duplicate point text object 614 and position the duplicate point text object 614 at the same vertical position as the reference baseline 608 of the text line 604. In some embodiments, however, the merged text object generation system 106 generates the duplicate point text object 614 in the background. To illustrate, the merged text object generation system 106 can generate or maintain a virtual space and generate the duplicate point text object 614 within the virtual space. The merged text object generation system 106 can further generate a duplicate reference baseline that corresponds to the reference baseline 608 of the text line 604 and position the duplicate point text object 614 at the same vertical position as the duplicate reference baseline within the virtual space.

As shown in FIG. 6C, the merged text object generation system 106 modifies the digital character 616 of the duplicate point text object 614 based on a character rotation that corresponds to the point text rotation of the digital point text object 602. Indeed, the merged text object generation system 106 can determine or otherwise identify a character rotation that corresponds to the point text rotation associated with the digital point text object 602. For example, the merged text object generation system 106 can identify a rotation value of the point text rotation associated with the digital point text object 602 using a table of predefined rotation values. The merged text object generation system 106 can determine a rotation value for a character rotation that would correspond to (e.g., match) the identified rotation value of the point text rotation. Accordingly, the merged text object generation system 106 can modify the digital character 616 based on the determined character rotation. In other words, the merged text object generation system 106 rotates the digital character 616 to correspond to (e.g., match) the point text rotation of the digital point text object 602.

As shown in FIG. 6D, the merged text object generation system 106 determines (e.g., extracts) the left point 620 of the digital character 616. In one or more embodiments, the left point 620 of the digital character 616 is the origin of the digital character 616 (i.e., the glyph origin). In one or more embodiments, the merged text object generation system 106 identifies coordinates associated with the left point 620 of the digital character 616, represented as $L\{x_L, y_L\}$. For example, in some embodiments, the merged text object generation system 106 determines the coordinates of the left point 620 using a coordinate system based on the baseline 622 of the duplicate point text object 614 (e.g., with the origin established at the anchor point 618). As shown in FIG. 6D, the merged text object generation system 106 can similarly determine the right point 624 of the digital character 616. The merged text object generation system 106 can further identify coordinates associated with the right point 624 of the digital character 616 (represented as $R\{x_R, y_R\}$).

In one or more embodiments, the merged text object generation system 106 determines a translation associated with the left point 620 of the digital character 616 with respect to the anchor point 618 of the duplicate point text object 614. For example, the merged text object generation system 106 can determine a horizontal translation (shown as $\Delta x$) and a vertical translation (shown as $\Delta y$) of the left point 620 of the digital character 616 from the anchor point 618 of the duplicate point text object 614. In instances where the merged text object generation system 106 identifies coordinates associated with the left point 620 using a coordinate system based on the baseline 622 of the duplicate point text object 614 (e.g., with origin at anchor point 618), the merged text object generation system 106 can determine the horizontal translation based on the x coordinate ($x_L$) and the vertical translation based on the y coordinate ($y_L$).

As shown in FIG. 6E, the merged text object generation system 106 utilizes the analysis of the duplicate point text object 614 to determining a baseline shift to match the point text rotation of the digital point text object 602. In particular, the merged text object generation system 106 utilizes the translation associated with the left point 620 of the digital character 616 to identify a translation-based anchor point 626 of the digital point text object 602. To illustrate, in one or more embodiments, the merged text object generation system 106 subtracts the horizontal translation and vertical translation of the left point 620 of the digital character 616 from a position of the anchor point 610 of the digital point text object 602. In other words, as shown in FIG. 6E, the anchor point 610 of the digital point text object 602 is associated with coordinates $A\{x,y\}$. The merged text object generation system 106 can determine the position of the translation-based anchor point 626 (shown as A') of the digital point text object 602 by subtracting $\Delta x$ from x and $\Delta y$ from y. In one or more embodiments, the translation-based anchor point 626 represents the anchor point of the digital point text object 602 had the digital point text object 602 not been rotated (i.e., the anchor point if only the digital character 612 had been rotated). In one or more embodiments, the merged text object generation system 106 discards the duplicate point text object 614 upon identifying the translation-based anchor point 626 of the digital point text object 602.

In one or more embodiments, the merged text object generation system 106 determines a baseline shift associated with digital point text object 602 using the translation-based anchor point 626. In particular, the merged text object generation system 106 can determine a vertical shift 628 between the translation-based anchor point 626 and the reference baseline 608 of the text line 604. Thus, the merged text object generation system 106 determines a baseline shift to match the point text rotation of the digital point text object 602 by comparing the left point 620 of the digital character 616 of the duplicate point text object 614 to the translation-based anchor point 626 of the digital point text object 602 to determine the vertical shift 628 of the translation-based anchor point 626 of the digital point text object 602 from the reference baseline 608 associated with the digital point text object 602. In one or more embodiments, the merged text object generation system 106 prioritizes determining point text rotation associated with digital point text objects ahead of baseline shift as the point text rotation may be inherently associated with a baseline shift.

In one or more embodiments, a digital point text object includes a plurality of digital characters. Accordingly, the merged text object generation system 106 can generate a duplicate point text object that includes a plurality of corresponding digital characters to determine a point text rotation and matching baseline shift associated with each digital character of the digital point text object. To illustrate, the merged text object generation system 106 can rotate the digital characters in the duplicate point text object based on the point text rotation of the digital point text object. Moreover, the merged text object generation system 106 can determine a baseline shift for each subsequent digital character separately by determining the left point of a given subsequent digital character to determine an additional baseline shift associated with that subsequent digital character.

Based on determining the point text rotation associated with the digital point text object 602, the merged text object generation system 106 can modify font character properties of the resulting merged digital point text object to reflect the point text rotation. In particular, the merged text object generation system 106 can modify the digital text of the merged digital point text object by modifying, within the merged digital point text object, the digital character 612 represented in the digital point text object 602 based on the character rotation corresponding to the point text rotation of the digital point text object 602.

The algorithm presented below is another characterization of how the merged text object generation system 106 determines a point text rotation associated with a digital point text object. The algorithm further provides another characterization of how the merged text object generation system 106 determines a baseline shift that matches the point text rotation.

Algorithm
1. Need to extract the actual anchor point position of this rotated point text as in addition to the rotation, baseline shift may also have been applied on this glyph and we need to retain combination of all the character properties intact.
2. Create a duplicate point text object at the same horizontal position as the vertical position of the current text line.
3. Set the content of the duplicate point text object as that of the current rotated digital point text object.
4. Set the character rotation of the duplicate point text object as that of the current digital point text objects text art rotation.
5. Glyphs of both the current digital point text object and the duplicate point text object seem to be rotated, but the current digital point text object has art transformation applied onto it and the duplicate point text object has the character rotation applied to it.
6. Extract the left and right points of the leftmost and rightmost glyphs of the duplicate point text object.
7. Find the translation difference of the left point of the leftmost glyph of the duplicate point text object from its anchor point
8. Subtract this translation difference from the anchor point position (position A) of the current digital point text object to update it.
9. A'—This is the correct anchor point position of the current digital point text object if the rotation applied to it was in the form of character rotation and not as the text art rotation.
10. Dispose the duplicate point text object.
11. Iterate through each text run of the text range.
    a. Update the character rotation to be the calculated rotation angle.
    b. Based on the updated anchor point position, update (if any) the baseline shift of the rotated text.

Figure 7A:
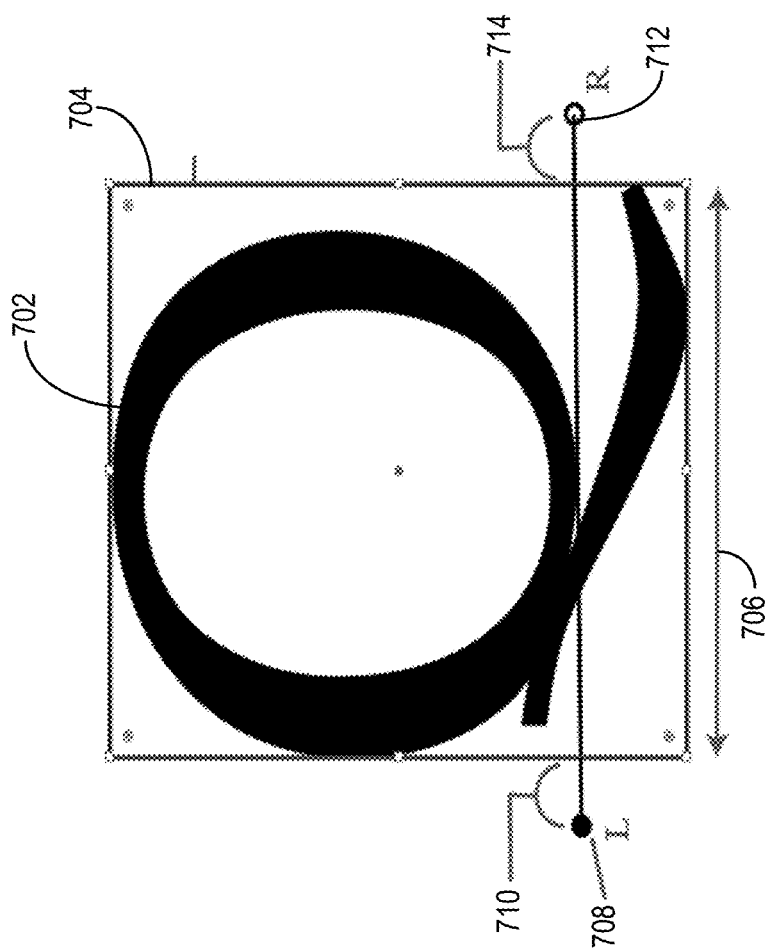
FIGS. 7A-7C illustrate diagrams for determining a point text spacing associated with digital point text objects in accordance with one or more embodiments.
Figure 7B:
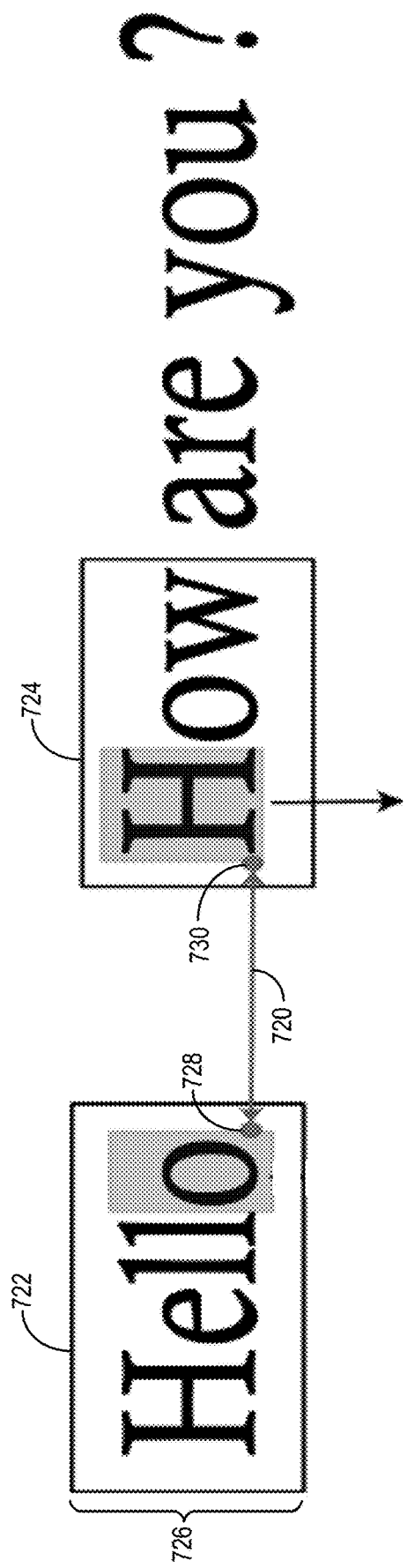
Figure 7C:
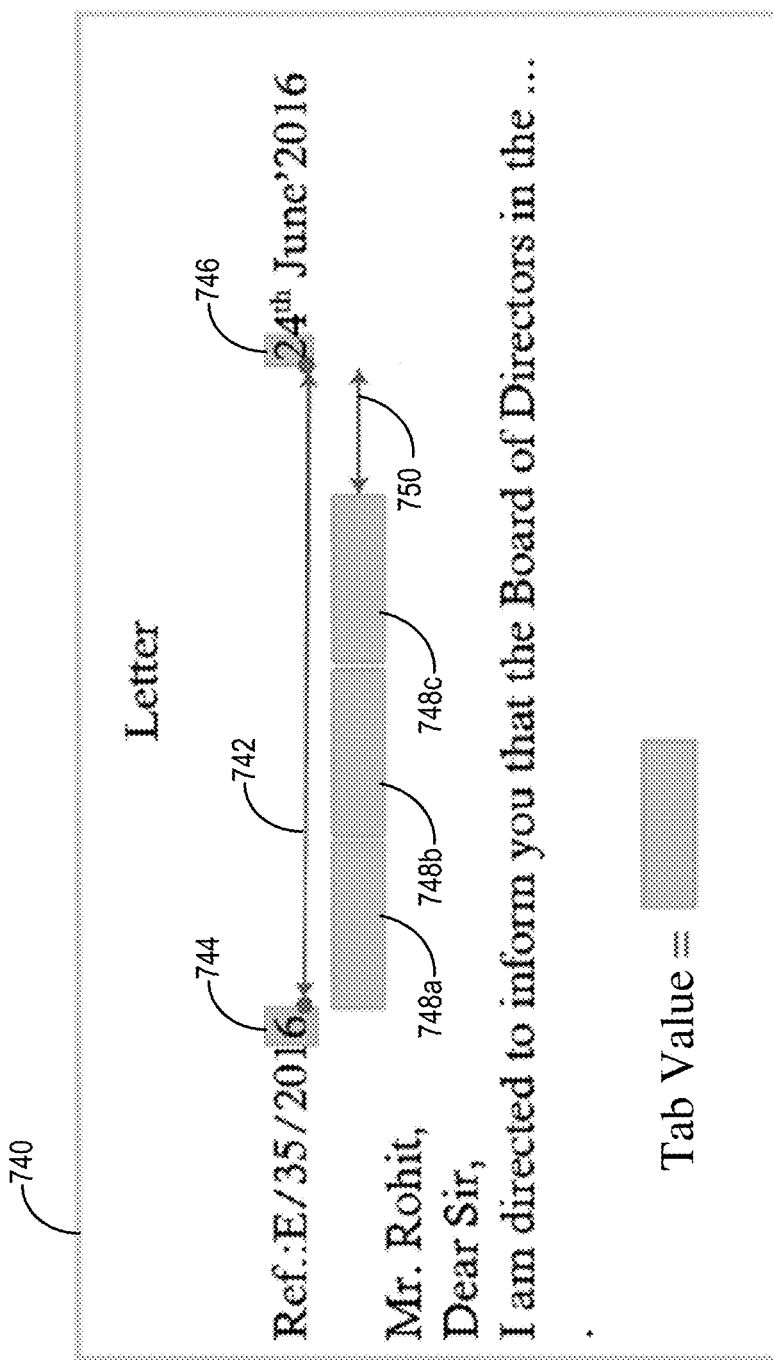

In one or more embodiments, the merged text object generation system 106 determines the point text character properties associated with the digital text reflected in the plurality of digital point text objects by determining a point text spacing between digital point text objects. The merged text object generation system 106 can modify font character properties of the resulting merged digital point text object to reflect the determined point text spacing. The FIGS. 7A-7B illustrate diagrams for determining a point text spacing between a pair of digital point text objects in accordance with one or more embodiments. FIG. 7C illustrates a diagram for modifying font character properties of a merged digital point text object to reflect point text spacing in accordance with one or more embodiments.

FIG. 7A illustrates a digital character 702 in accordance with one or more embodiments. As shown in FIG. 7A, the digital character 702 is associated with a character bounding box 704, a character width 706 (e.g., the width of the character bounding box 704), a left point 708, a left character bearing 710, a right point 712, and a right character bearing 714. In one or more embodiments, the left point 708 corresponds to the origin of the digital character 702. As shown in FIG. 7A, in some embodiments, the left point 708 is associated with a pair of coordinates $\{x, y\}$. In one or more embodiments, the merged text object generation system 106 determines the right point 712 of the digital character 702 as follows:

$$\text{RightPoint} = \text{LeftPoint} + \cos(\theta) \times (\text{LeftBearing} + \text{CharacterWidth} + \text{RightBearing}) \quad (1)$$

In some embodiments, the merged text object generation system 106 determines the right point 712 of the digital character 702 (i.e., determines the coordinates associated with the right point 712) based on the pair of coordinates associated with the left point 708 of the digital character 702 as follows:

$$\text{RightPoint} = \{x + \text{LeftBearing} + \text{CharacterWidth} + \text{RightBearing}, y\} \quad (2)$$

In one or more embodiments, a digital point text object includes a single digital character (as shown above). Accordingly, the merged text object generation system 106 can determine a left position and a right position of the digital point text object based on the left point and the right point of the digital character respectively. In some embodiments, however, the digital point text object includes a plurality of digital characters. Accordingly, the merged text object generation system 106 can determine a left position of the digital point text object based on a left point of the left-most digital character represented in the digital point text object. Similarly, the merged text object generation system 106 can determine a right position of the digital point text object based on a right point of the right-most digital character represented in the digital point text object.

The algorithm presented below is another characterization of how the merged text object generation system 106 determines a left position and a right position of a digital point text object. It should be noted that the algorithm presented below utilizes the term "LeftPosition" when referring to a left point of a glyph; however, as the algorithm refers to the first glyph (i.e., digital character) in a point text object, the left point of the glyph corresponds to the left position of the digital point text object.

Algorithm
1. Iterate through each glyph of the text range of the digital point text object.
   a. If it is the first glyph:
      i. Extract its glyph origin.
      ii. This is the left position of the left most glyph of the current digital point text object.
   b. Else, if it is the last glyph:
      i. Extract its glyph origin.
      ii. Extract the left bearing and right bearing of this glyph.
      iii. Extract the glyph width from its bounding box.
      iv. RightPosition=GlyphOrigin+Cos(theta)*(LeftBearing+GlyphWidth+RightBearing).

As shown in FIG. 7B, the merged text object generation system 106 can determine a point text spacing between a first digital point text object 722 and a second digital point text object 724. As shown, the second digital point text object 724 follows the first digital point text object 722 in a text line 726. The merged text object generation system 106 can determine the point text spacing between the first digital point text object 722 and the second digital point text object 724 based on the right position of the first digital point text object 722 (i.e., the right position 728) and the left position of the second digital point text object 724 (i.e., the left position 730). Indeed, the merged text object generation system 106 can determine a spacing distance 720 between the right position 728 of the first digital point text object 722 and the left position 730 of the second digital point text object 724 and determine the point text spacing to include the spacing distance 720.

As shown in FIG. 7C, the merged text object generation system 106 modifies font character properties of a merged digital point text object 740 to reflect a determined point text spacing between digital point text objects. For example, as shown in FIG. 7C, the merged text object generation system 106 generates, within the merged digital point text object 740, the text spacing 742 between the digital character 744 and the digital character 746. In particular, the text spacing reflects a point text spacing between a first digital point text object that includes the digital character 744 and a second digital point text object that includes the digital character 746. Indeed, the digital character 744 corresponds to a final digital character of the first digital point text object and the digital character 746 represents an initial digital character of the second digital point text object.

In one or more embodiments, the merged text object generation system 106 generates the text spacing using one or more tab/space values or kerning values. For example, as shown in FIG. 7C, the merged text object generation system 106 generates the text spacing 742 within the merged digital point text object 740 using the tab values 748a-748c and the kerning values 750. As an example, the merged text object generation system 106 can determine that the point text spacing between digital point text objects is greater than at least one tab value. If the point text spacing is greater than at least one tab value, the merged text object generation system 106 can determine the number of tab values that can, at most, be included within the text spacing. For the remaining space to be filled in the text spacing, the merged text object generation system 106 can insert kerning (i.e., one or more kerning values). In one or more embodiments, the merged text object generation system 106 determines the kerning to insert within the text spacing as follows where "Distance" represents the amount of remaining space to be filled within the text spacing:

$$K=(1000\times Distance)/(FontSize\times HorizontalScale) \qquad (3)$$

The algorithm presented below is another characterization of how the merged text object generation system 106 determines a point text spacing between digital point text objects and generates the corresponding text spacing.

Algorithm
1. Distance between glyphs=get the distance between the current digital point text object's left most glyph's left point and the previous digital point text object's right most glyph's right point
2. Set the spacing between the current digital point text object and the previous digital point text object in either of the following ways:
   a. If distance is more than a tab width of the previous digital point text object's right most glyph's character style:
      i. Calculate the number of tab characters that, at most, can be accommodated between the consecutive digital point text objects
      ii. For the remaining spacing, insert the kerning between the current and previous digital point text object glyphs
      iii. Calculate the kerning in the following fashion:
         1. K=(1000*distance)/(fontSize*Horizontal Scale)

Figure 8:
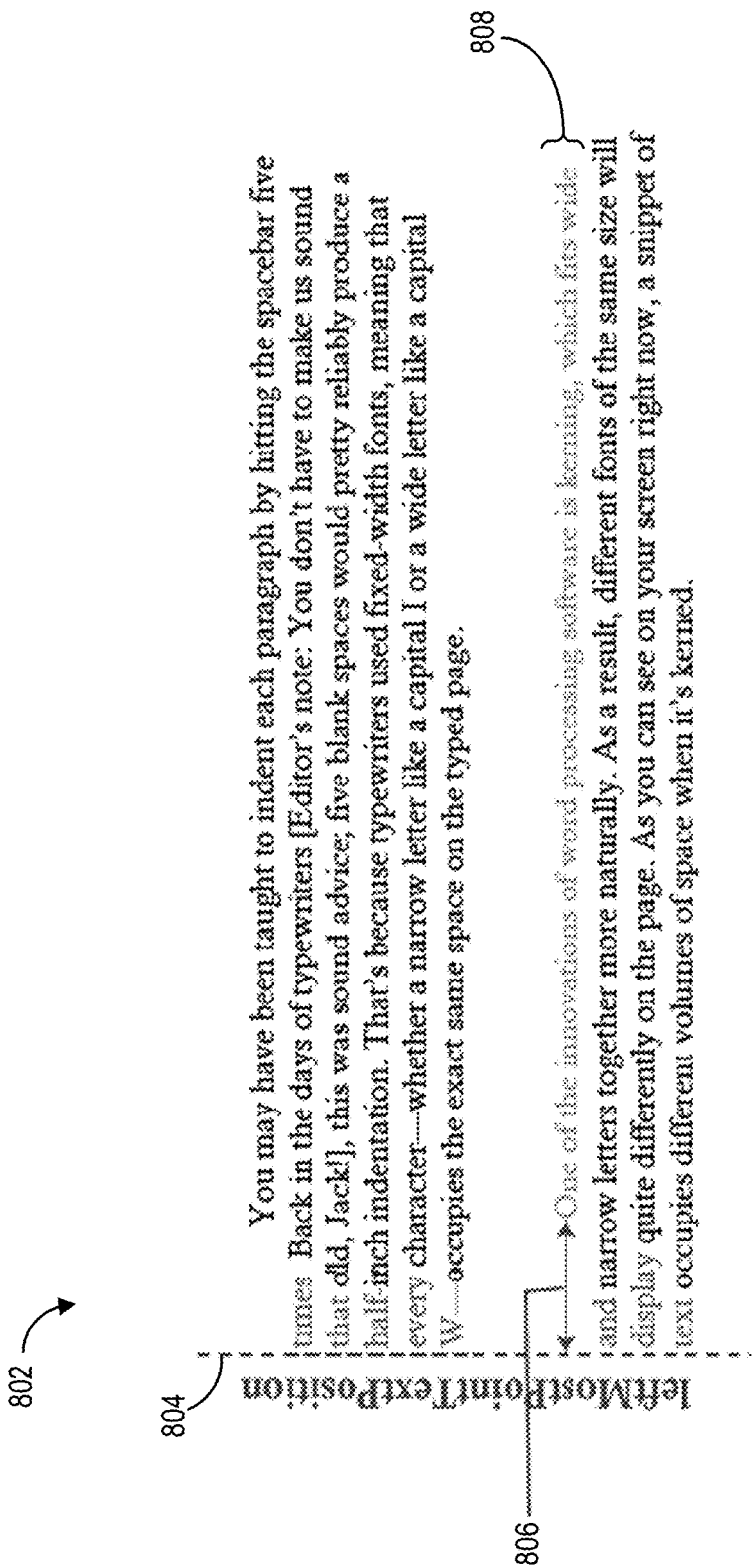
FIG. 8 illustrates a diagram for determining a text line indent associated with a text line of digital text in accordance with one or more embodiments.

In one or more embodiments, the merged text object generation system 106 determines the point text character properties associated with digital text reflected in a plurality of digital point text objects by determining a text line indent associated with a text line of the digital text. FIG. 8 illustrates a diagram for determining a text line indent associated with a text line in accordance with one or more embodiments. As shown in FIG. 8, the merged text object generation system 106 determines the text line indent associated with a particular text line by comparing the horizontal position of an initial digital point text object of the text line and a horizontal position of the left-most digital point text object within the plurality of digital point text objects.

In particular, FIG. 8 illustrates a plurality of digital point text objects 802 (the boundary boxes of the plurality of digital point text objects 802 are not shown). The merged text object generation system 106 can identify a left-most digital point text object from the plurality of digital point text objects. In one or more embodiments, there are multiple left-most digital point text objects. The merged text object generation system 106 can further determine a horizontal position associated with the left-most digital point text object (represented by the dashed line 804). For example, the merged text object generation system 106 can identify the anchor point of the left-most digital point text object and determine the horizontal position associated with the leftmost digital point text object based on the anchor point.

In one or more embodiments, to determine a text line indent associated with a particular text line (e.g., a text line that is different from the text line that includes the left-most digital point text object), the merged text object generation system 106 identifies an initial digital point text object of the text line. The merged text object generation system 106 further determines a horizontal position of the initial digital point text object (e.g., based on an anchor point of the initial digital point text object). The merged text object generation system 106 determines the text line indent by comparing the horizontal position of the initial digital point text object of the text line with the horizontal position of the left-most digital point text object. In one or more embodiments, if the horizontal positions are equal, the merged text object generation system 106 determines that there is no text line indent associated with the text line. If the horizontal positions are different, however, the merged text object generation system 106 determines that there is a text line indent associated with that particular text line. As an illustration, FIG. 8 illustrates a text line indent 806 associated with a text line 808.

Based on determining the text line indent associated with a particular text line (i.e., associated with an initial digital point text object of the text line), the merged text object generation system 106 can modify font character properties of the corresponding merged digital point text object to reflect the text line indent. In one or more embodiments, the merged text object generation system 106 can modify the digital text of the merged digital point text object by applying an indentation to the text line within the merged digital point text object. As an example, in one or more embodiments, the merged text object generation system 106 applies one or more tab values and/or space values before the initial digital character of a text line to reflect the text line indent.

As another example, in one or more embodiments, the merged text object generation system 106 adds an indentation to the text line in the form of a paragraph indent within the merged digital point text object. In some embodiments, the merged text object generation system 106 adds the indentation after adjusting all other characteristics of the digital text. To illustrate, the merged text object generation system 106 can push an indentation value associated with each text line to a vector and then apply the indentation values to the applicable text lines after forming the paragraphs. In one or more embodiments, in using this approach, the merged text object generation system 106 associates each text line of the digital text with a separate paragraph.

The algorithm presented below is another characterization of how the merged text object generation system 106 determines the text line indent associated with a text line. The algorithm further provides another characterization of how the merged text object generation system 106 adds an indentation to a text line.

Algorithm
1. leftMostPointTextPosition=retrieve the position of the anchor point of the left most digital point text object.
2. When encountering the start of a new text line, calculate the left indent of this text line based on the difference between the anchor point of the current digital point text object and leftMostPointTextPosition.
3. Update the left indent of current text line via either of the following ways:
    a. Add the left indent as paragraph indent.
        i. Adding indent to the text line in the form of paragraph indent requires each line to be a paragraph in itself.
        ii. Add this indent after adjusting all other characteristics of text in selection.
        iii. Push the left indent value to a vector maintaining the left indent of each line (LeftIndentVec) to add the indent to each line in the final stage so that this indent does not overrides the indents of consecutive upcoming text lines.
    b. Add the combination of tab stop and space characters before the first digital point text object.

Figure 9:
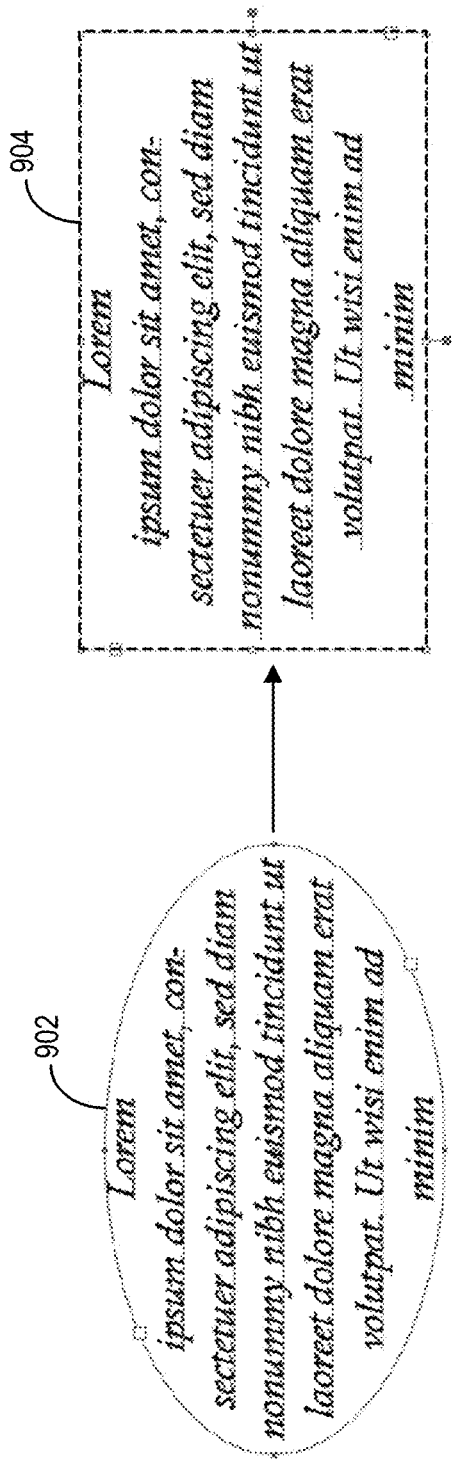
FIG. 9 illustrates a diagram for generating a merged digital text object based on a plurality of digital point text objects defined by a non-rectangular boundary in accordance with one or more embodiments.

In one or more embodiments, the digital text reflected in a plurality of digital point text objects follows a boundary having a non-rectangular path. For example, an area text object of an imported digital document can be defined by a non-rectangular boundary, such as an oval boundary. FIG. 9 illustrates a diagram for modifying font character properties of a merged digital point text object to represent a non-rectangular boundary in accordance with one or more embodiments.

As an example, and as shown in FIG. 9, the merged text object generation system 106 can determine point text character properties associated with digital text represented in an area text object 902 defined by an oval boundary. In particular, the area text object 902 can represent an area text object from an imported digital document. Indeed, upon importing a digital document containing the area text object 902, the merged text object generation system 106 can represent the digital text within a plurality of digital point text objects as discussed above. The plurality of digital point text objects may follow the same pattern formed by the oval boundary of the area text object 902 though there may not be a boundary defining that pattern for the digital point text objects. In one or more embodiments, the merged text object generation system 106 determines the point text character properties associated with the digital text as represented in the plurality of digital point text objects. As further discussed above, the merged text object generation system 106 can merge the plurality of digital point text objects to generate the merged digital point text object 904.

The merged text object generation system 106 can modify font character properties of the merged digital point text object 904 to reflect the point text character properties. For example, in one or more embodiments, the merged text object generation system 106 inserts space (e.g., an indentation, a text spacing, etc.) between the left boundary of the merged digital point text object 904 and a given text line to reflect the left-side positioning of the text line as defined by the oval boundary of the area text object 902. Further, the merged text object generation system 106 can add a newline character to the end of a given text line to reflect the right-side positioning of the text line as defined by the oval boundary of the area text object 902.

In one or more embodiments, the merged text object generation system 106 determines the point text character properties associated with the digital text reflected in the plurality of digital point text objects by determining a vertical text line shift associated with a text line of the digital text. Indeed, as discussed above with reference to FIGS. 5A-5C, the merged text object generation system 106 can determine a baseline shift associated with a digital point text object using a reference baseline established based on the initial digital point text object included in the same text line.

However, there may be cases where the initial digital point text object is associated with a vertical shift, such as when the initial digital point text object is associated with a baseline shift or the entire text line has been shifted vertically within the digital text. FIG. 10A illustrates a diagram for determining a vertical text line shift associated with a text line of digital text in accordance with one or more embodiments. FIG. 10B illustrates a diagram for modifying font character properties of a merged digital point text object to reflect the vertical text line shift in accordance with one or more embodiments.

In particular, FIG. 10A illustrates a plurality of digital point text objects 1002 (the boundary boxes of the plurality of digital point text objects 1002 are not shown) organized into a plurality of text lines, including the text line 1004. In one or more embodiments, the merged text object generation system 106 determines a vertical position of the text line 1004 as represented in the plurality of digital point text objects 1002 (e.g., with regard to the first digital point text object in that text line). In other words, the merged text object generation system 106 determines the vertical position of the baseline (e.g., the reference baseline) associated with the text line 1004. In some embodiments, the merged text object generation system 106 generates an original vertical position vector that stores the vertical position of each text line represented in the plurality of digital point text objects 1002.

In one or more embodiments, the merged text object generation system 106 further determines the vertical position of the text line 1004 within the merged digital point text object 1006 by identifying the initial digital character of the text line 1004, determining the left point (e.g., the origin) of the initial digital character, and determining the vertical position of the left point of the initial digital character. In some embodiments, the vertical position of the left point of the initial digital character corresponds to the vertical position of the text line 1004 within the merged digital point text object 1006. In one or more embodiments, the merged text object generation system 106 stores the vertical position of the text line 1004 as reflected within the merged digital point text object 1006 within a current vertical position vector that stores the vertical position of each text line represented in the merged digital point text object 1006.

In one or more embodiments, the merged text object generation system 106 determines the vertical text line shift associated with the text line 1004 as represented in the plurality of digital point text objects 1002 by comparing the vertical position for the text line 1004 stored within the original vertical position vector with the vertical position for the text line 1004 stored within the current vertical position vector. By making this comparison, the merged text object generation system 106 can determine if the text line 1004 had been shifted vertically as that information may be lost when generating the merged digital point text object 1006. In other words, the text line 1004 may not be vertically shifted when the merged digital point text object 1006 is initially generated, so determining the difference in vertical positions enables the merged text object generation system 106 to determine the vertical text line shift originally associated with the text line 1004.

As shown in FIG. 10B, the merged text object generation system 106 modifies font character properties of the merged digital point text object 1006 to reflect the vertical text line shift associated with the text line 1004. As an illustration, in one or more embodiments, the merged text object generation system 106 determines the font character properties by subtracting any vertical text line shift already accounted for (e.g., newline characters) from the difference between the vertical position for the text line 1004 stored within the original vertical position vector and the vertical position for the text line 1004 stored within the current vertical position vector. If a difference between the vertical positions remains, the merged text object generation system 106 determines a number of new line characters that can be included within the remaining difference. In some embodiments, the height of a newline character corresponds to the difference in vertical positions between two adjacent text lines. The merged text object generation system 106 inserts this number of new line characters (i.e., the new line characters 1010a-1010b) between the text line 1004 and the previous text line 1008. If a difference in vertical positions still remains (i.e., if the text line 1004 still has not reached a vertical position corresponding to the vertical position stored within the original vertical position vector), the merged text object generation system 106 further adjusts the text line 1004 by vertically shifting the text line 1004 within the merged digital point text object 1006 (as shown by the vertical shift 1012).

Figure 10C:
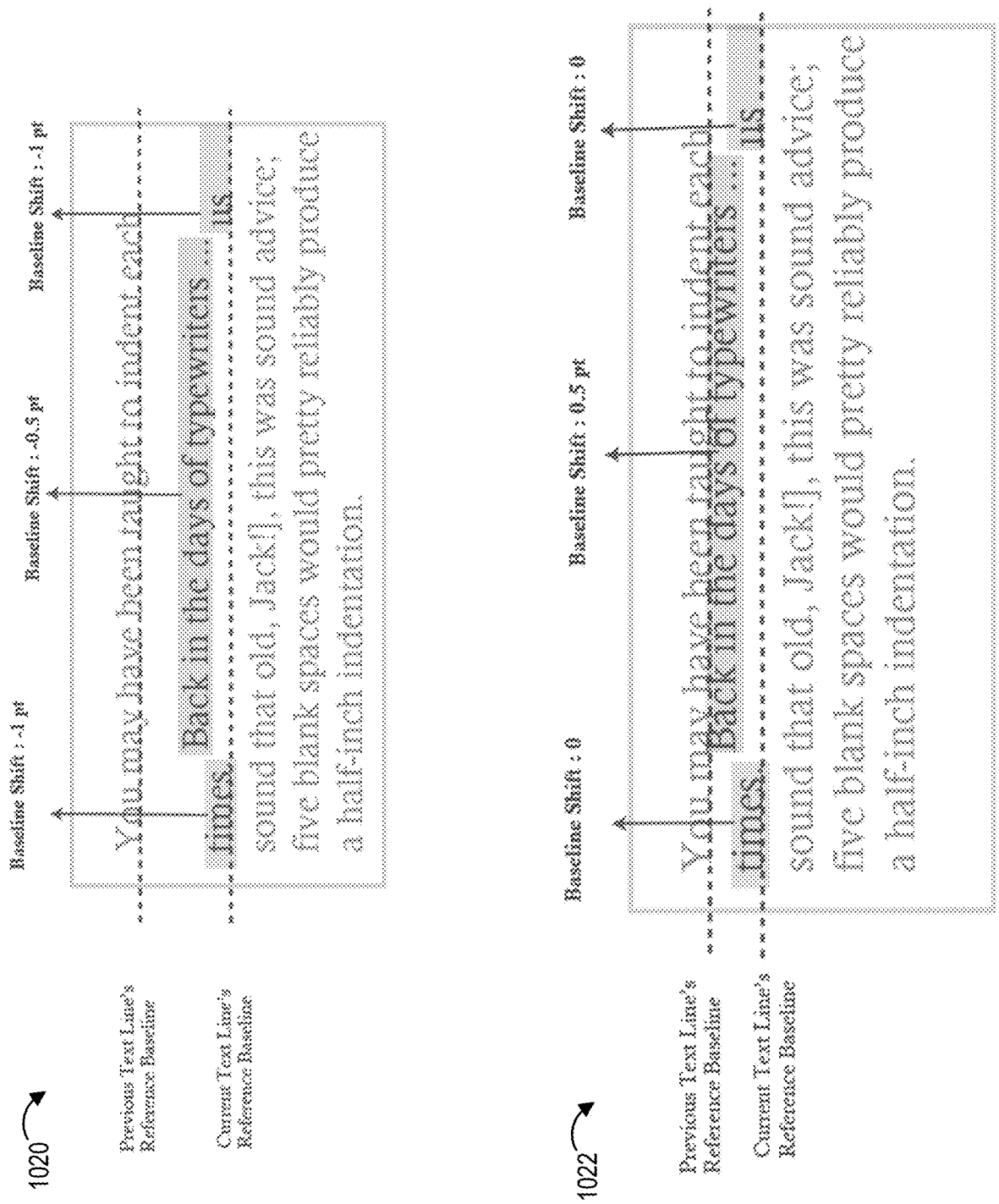
FIG. 10C illustrates a diagram of digital text resulting from a failure of some conventional systems to detect a vertical shift associated with a text line of digital text.

As mentioned above, the merged text object generation system 106 can also correct vertical shift where the initial text (or different portions of text) in a text line have a modified vertical position relative to a standard baseline. For example, as shown in FIG. 10C, the digital text 1020 includes a text line that, as a whole, is associated with different vertical shifts. In particular, the text line beginning with the word "times" is associated with a vertical shift of −1 pt. with respect to where the baseline of an unshifted text line would appear. Further, the phrase "Back in the days of typewriters . . . " is associated with a vertical shift of −0.5 pt., showing an additional shift with respect to the baseline of the text line as a whole.

As shown in FIG. 10C, without a vertical text line shift, the digital text 1022 for the word "times" is placed on the baseline itself (e.g., with a baseline shift of 0 pt.). Moreover, the digital text 1022 for the phrase "Back in the days of typewriters . . . " includes a baseline shift of 0.5 pt. As shown, this configuration fails to mirror the original configuration of the digital text 1020. By detecting and applying vertical shifts associated with text lines, as described above, the merged text object generation system 106 can recreate the visual appearance originally associated with the digital text 1020.

The algorithm presented below is another characterization of how the merged text object generation system 106 determines a vertical text line shift associated with a text line of digital text. The algorithm further provides another characterization of how the merged text object generation system 106 modifies font character properties of a merged digital point text object to reflect the vertical text line shift.

Algorithm

1. Maintain a vector of the vertical position of the actual baseline of the current text line to recreate the vertical text layout.
2. Perform the algorithm once the entire layout for other properties has been adjusted.
3. Iterate through each text line of the merged text object:
   a. Extract the very first left most glyph of the text line.
   b. Extract its glyph origin.
   c. CurrentBaseLinePosition=get the current vertical baseline position attained by the current text line from the vertical position of the glyph origin.
   d. Push this CurrentAttainedBaselinePos to the vector CurrentAttainedBaselineVec 4. Now, there are two vectors:
   a. OrigBaselinePosVec: original baseline position of the first digital point text object of each text line.
   b. CurrentAttainedBaselineVec: baseline position attained by first digital point text object of each text line.
5. Till now, the layout of each text line itself has been done accurately in terms of the following character properties:
   a. Kerning
   b. Character rotation
   c. Baseline shift
6. But, text lines, altogether need to be managed in the following manner in which there is a need to append some baseline shift and/or new line characters to the entire text in the text line to match the original layout:
   a. For each text line starting from the second one:
      i. Get the difference in the original and attained baseline position.
      ii. Subtract any baseline shift already accommodated in the previous iteration of the text line in terms of number of new line characters appended to match the space sequence whose effect has been propagated to all the text lines below.
      iii. If (diff>0)
         1. Get the number of new line characters that can be accommodated to compromise for the spacing difference.
         2. NewLineCharacterHeight=Diff in the baseline of the current and previous text line.
         3. Insert this number of new line characters.
         4. The remaining space is adjusted using a baseline shift appended to each text run of the current text line.

By determining point text character properties associated with the digital text represented in a plurality of digital point text objects and further determining corresponding font character properties, the merged text object generation system 106 can operate more flexibly than conventional systems. For example, the merged text object generation system 106 can restore font character properties that are lost in the process of importing digital text. Further, the merged text object generation system 106 can more flexibly merge digital point text objects that are associated with point text character properties, such as point text rotation and baseline shift, that do not merge effectively under conventional systems. Additionally, by restoring the font character properties of the digital text, the merged text object generation system 106 can provide a more accurate representation (e.g., a more accurate visual representation) of digital text that was originally generated with an area text object but imported as a plurality of digital point text objects.

Additionally, by modifying font character properties of the merged digital point text object, the merged text object generation system 106 can operate more efficiently. Indeed, the merged text object generation system 106 can reduce the number of steps required by a user to recreate the area text object of the imported digital text (e.g., via a user interface). Accordingly, the merged text object generation system 106 can reduce the computing resources (e.g., computing time and power) required to process and respond to manual user input for recreating those properties.

Figure 11:
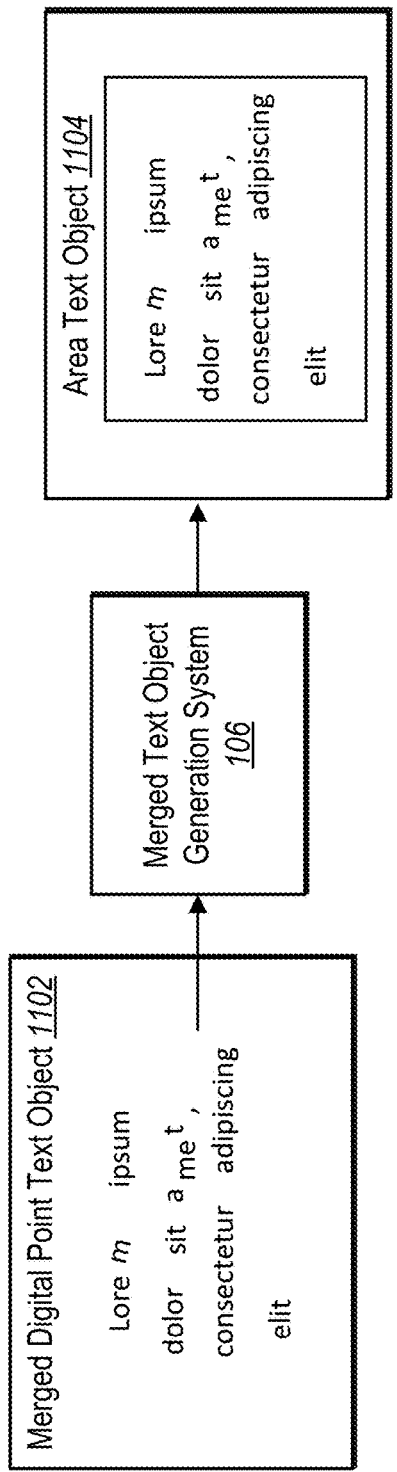
FIG. 11 illustrates a block diagram for generating an area text object based on a merged digital point text object in accordance with one or more embodiments.

As mentioned above, in one or more embodiments, the merged text object generation system 106 generates an area text object based on a merged digital point text object. FIG. 11 illustrates a block diagram for generating an area text object in accordance with one or more embodiments. As shown in FIG. 11, the area text object 1104 includes the digital text represented in the merged digital point text object 1102 (and previously represented in a plurality of digital point text objects). As further shown in FIG. 11, the area text object 1104 further includes a set of font character properties that reflect the point text character properties associated with the plurality of digital point text objects. In other words, the area text object 1104 includes the modifications to the character properties of the merged digital point text object 1102.

By generating an area text object that includes the digital text and associated font character properties, the merged text object generation system 106 can operate more accurately and more flexibly than conventional systems. Indeed, by generating an area text object that includes the digital text, the merged text object generation system 106 can provide a more accurate representation of imported digital text that was originally generated within an area text object (i.e., the merged text object generation system 106 more accurately recreates the original area text object itself). Further, generating the area text object provides more flexible editability, allowing a user to make changes to the digital text while avoiding the risk of changing the visual appearance of the digital text as a whole.

Figure 12:
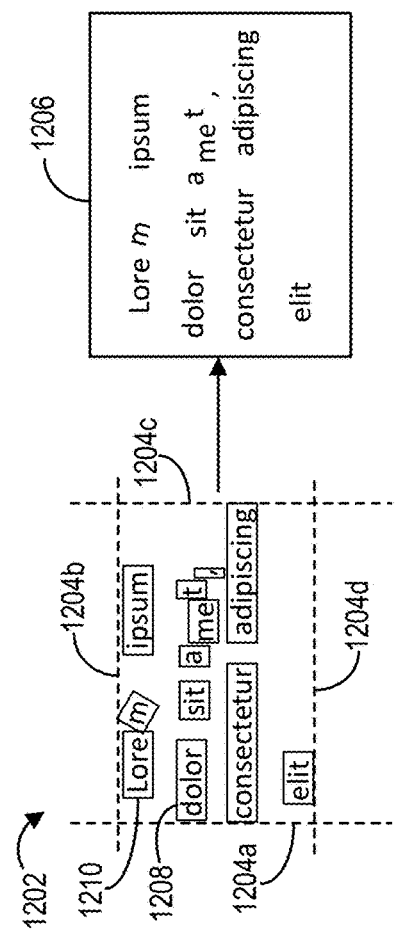
FIG. 12 illustrates a block diagram for generating an area text boundary box for an area text object in accordance with one or more embodiments.

In one or more embodiments, the merged text object generation system 106 generates an area text object by generating an area text boundary box to define the area text object. FIG. 12 illustrates a block diagram for generating an area text boundary box in accordance with one or more embodiments.

As shown in FIG. 12, the merged text object generation system 106 generates the area text boundary box 1206 based on the boundaries 1204a-1204d of the plurality of digital point text objects 1202. In one or more embodiments, the merged text object generation system 106 identifies the boundaries 1204a-1204d of the plurality of digital point text objects 1202 based on the boundaries of the individual digital point text objects. For example, the merged text object generation system 106 can identify the left boundary 1204a based on the left boundary of a left-most digital point text object (e.g., the digital point text object 1208) from the plurality of digital point text objects 1202. Similarly, the merged text object generation system 106 can identify the top boundary 1204b based on the top boundary of a top-most digital point text object (e.g., the digital point text object 1210.

As mentioned, the merged text object generation system 106 can generate the area text boundary box 1206 based on the boundaries 1204a-1204d. In one or more embodiments, the merged text object generation system 106 positions the boundaries of the area text boundary box 1206 to maintain the spacing between the plurality of digital point text objects 1202 and the boundaries 1204a-1204d. In some embodiments, the merged text object generation system 106 positions the boundaries of the area text boundary box 1206 to provide additional space (e.g., margins) between the boundaries of the area text boundary box 1206 and the included digital text.

Figure 13:
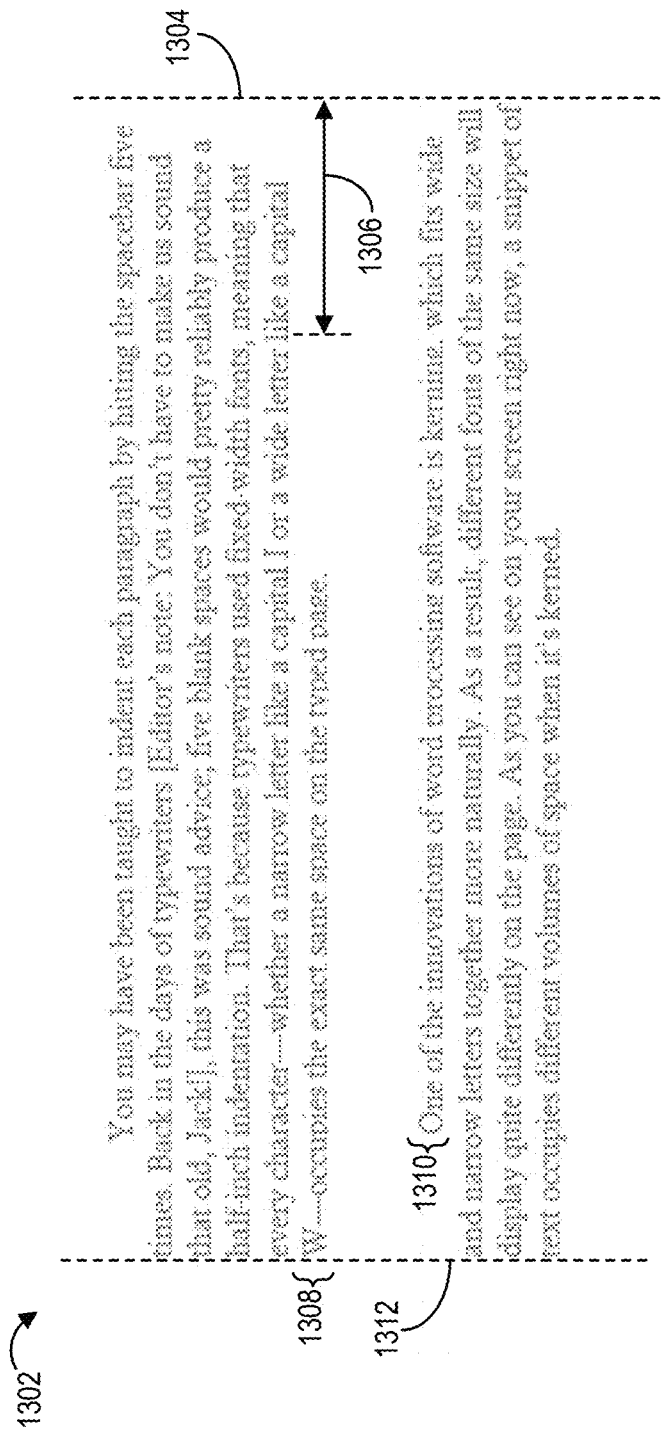
FIG. 13 illustrates a diagram for determining point text paragraph properties associated with digital text in accordance with one or more embodiments.

As mentioned above, in one or more embodiments, the merged text object generation system 106 groups the digital text into one or more paragraphs upon generating an area text object that includes the digital text. FIG. 13 illustrates a diagram for organizing digital text into one or more paragraphs within an area text object in accordance with one or more embodiments.

As shown in FIG. 13, the merged text object generation system 106 can group the digital text within an area text object based on point text paragraph properties associated with the digital text of merged digital point text object 1302. For example, the merged text object generation system 106 identifies an ending boundary 1304 that indicates a horizontal position at which text lines of the merged digital point text object 1302 end (e.g., an approximation of where the text lines end or a horizontal position at which the longest text line of the digital text ends).

The merged text object generation system 106 further identifies a text line end tolerance 1306. In one or more embodiments, the merged text object generation system 106 utilizes the text line end tolerance 1306 to determine whether a given text line is the last text line in a paragraph. For example, the merged text object generation system 106 can determine that the text line 1308 corresponds to the end of a paragraph based on the text line 1308 ending outside of the text line end tolerance 1306 (i.e., ending before the area occupied by the text line end tolerance 1306 is reached). Therefore, the merged text object generation system 106 can provide, within an area text object that includes the digital text, the text line 1308 grouped into the same paragraph as one or more of the preceding text lines. Further, the merged text object generation system 106 can provide the text line 1310 grouped into a separate paragraph.

In one or more embodiments, the merged text object generation system 106 further identifies one or more alignment properties or justification properties associated with the identified paragraphs. As an example, and as shown in FIG. 13, the merged text object generation system 106 identifies a beginning boundary 1312 that indicates a horizontal position at which text lines of the merged digital point text object 1302 begin (e.g., a horizontal position at which the left-most text line of the digital text begins). In one or more embodiments, if all the text lines in a particular paragraph (e.g., at least those text lines not associated with an indentation) begin at the beginning boundary 1312, the merged text object generation system 106 determines that a left alignment property is associated with the text lines of the paragraph. Accordingly, the merged text object generation system 106 can apply the left alignment property to the text lines of the paragraph within the area text object.

Though FIG. 13 illustrates a left alignment property, it should be noted that the merged text object generation system 106 can similarly identify and apply a right alignment property or a justification property. For example, the merged text object generation system 106 can identify a right alignment property by identifying an ending boundary that indicates a horizontal position at which text lines of the merged digital point text object end (e.g., a horizontal position at which the right-most text of the digital text ends). If all the text lines in a particular paragraph end at the ending boundary, the merged text object generation system 106 can determine that a right alignment property is associated with the text lines of the paragraph. In one or more embodiments, by detecting that the text lines of a paragraph are associated with a left alignment and a right alignment simultaneously, the merged text object generation system 106 determines that a justification property is associated with text lines of the paragraph.

In some embodiments, the merged text object generation system 106 iteratively adjusts the position and spacing of the digital text within the area text object. Indeed, the merged text object generation system 106 can adjust the digital characters of the digital text until their position remains intact.

Figure 14:
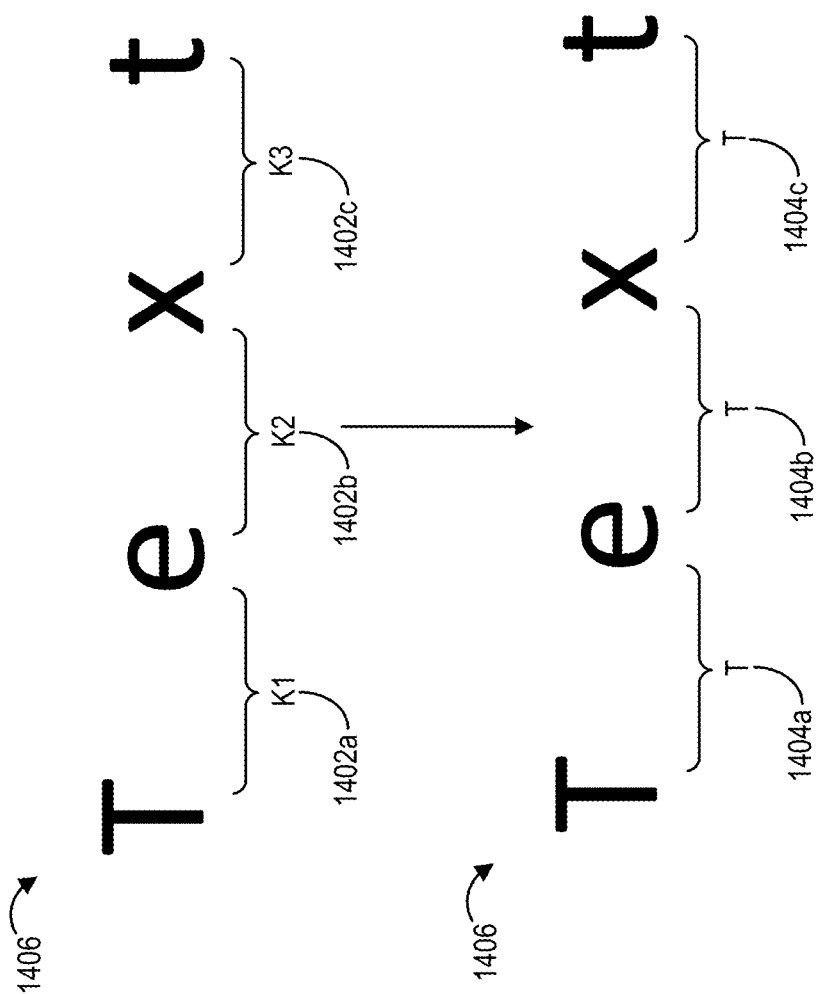
FIG. 14 illustrates a diagram for replacing font character properties associated with digital text in accordance with one or more embodiments.

In one or more embodiments, in generating the area text object, the merged text object generation system 106 can replace one or more of the modified font character properties to simplify the font character properties represented in the area text object. In some embodiments, the merged text object generation system 106 replaces font character properties associated with the digital text of the merged digital point text object (e.g., after modifying the font character properties to reflect the point text character properties). In some embodiments, the merged text object generation system 106 replaces font character properties associated with the digital text of the generated area text object. FIG. 14 illustrates a diagram replacing font character properties in accordance with one or more embodiments.

For example, as shown in FIG. 14, the merged text object generation system 106 determines that a text spacing of the modified font character properties is consistent between digital characters in a text line. In particular, the merged text object generation system 106 determines that, for the text line 1406, a first spacing 1402a (labeled K1), a second spacing 1402b (labeled K2), and a third spacing 1402c (labeled K3) is consistent between the respective digital characters. For example, in one or more embodiments, the first spacing 1402a, the second spacing 1402b, and the third spacing 1402c include one or more tab values and/or kerning values. Accordingly, the merged text object generation system 106 determines that the spacing is consistent for the text line 1406 by determining that K1=K2=K3 or that the tab and/or kerning values that make up K1, K2, and K3 result in the same spacing between the digital characters.

Based on determining that the first spacing 1402a, the second spacing 1402b, and the third spacing 1402c result in the same spacing, the merged text object generation system 106 modifies the text spacing to simplify the associated font character properties. Indeed, as shown in FIG. 14, the merged text object generation system 106 modifies the text spacing within the text line 1406 by replacing the spacings 1402a-1402c with the spacings 1404a-1404c that include the text tracking value (labeled as T, illustrating the same text tracking value is used for the spacings 1404a-1404c).

In one or more embodiments, the merged text object generation system 106 employs various additional or alternative methods to simplify the font character properties represented in the area text object. For example, because justification, kerning, and spacing all control the same property of visual appearance, the merged text object generation system 106 can prioritize justification, then spacing, and then kerning when adjusting the visual appearance of the digital text. Additionally, the merged text object generation system 106 can remove or modify irregular kerning or spacing values in order to provide a more reasonable adjustment.

As mentioned above, in one or more embodiments, the merged text object generation system 106 generates merged digital text objects for vertical digital text. In other words, the merged text object generation system 106 can generate vertical merged digital text objects (e.g., a vertical merged digital point text object or a vertical area text object). FIG. 15 illustrates a block diagram for generating vertical merged digital text objects in accordance with one or more embodiments.

As shown in FIG. 15, the merged text object generation system 106 can analyze the vertical digital text represented in a plurality of digital point text objects 1502 to determine point text character properties associated with the vertical digital text. In one or more embodiments, the merged text object generation system 106 determines the point text character properties associated with the vertical digital text similar to the above description. However, in many cases, reference characteristics associated with the vertical digital text is different than those associated with horizontal digital text. For example, in some embodiments, the baseline runs vertically down the center of the vertical digital text (leading to an anchor point along the center of the vertical digital text). Further, the origin of a digital character in vertical digital text is at the top of the digital character (i.e., rather than a left point and a right point, the digital character has a top point and a bottom point). The merged text object generation system 106 can determine the point text characteristics accordingly.

For example, the merged text object generation system 106 can determine a text direction for the vertical digital text similar to that discussed above with reference to FIG. 4, except that the vertical digital text corresponds to a vertical text direction (e.g., read from top to bottom where the text lines form a sequence that progresses from the left to the right or from the right to the left). Additionally, the merged text object generation system 106 can determine a baseline shift or a newline character associated with a given digital point text object as discussed above with reference to FIGS. 5A-5C, except that the merged text object generation system 106 focuses on a horizontal shift of a baseline of the digital point text object. Further, the merged text object generation system 106 can determine a point text rotation associated with a given digital point text object (and an associated baseline shift) as discussed above with reference to FIGS. 6A-6E, except that the merged text object generation system 106 determines the point text rotation based on a top point of a digital character included in the digital point text object. The merged text object generation system 106 can further determine a point text spacing between digital point text objects as discussed above with reference to FIGS. 7A-7B but based on a bottom position of a first digital point text object and a top position of a second digital point text object. The merged text object generation system 106 can also determine a text line indent associated with a text line of the vertical digital text as discussed above with reference to FIG. 8 but based on a top indent rather than a left indent. Further, the merged text object generation system 106 can determine text line shifts associated with text lines of the vertical digital text as discussed above with reference to FIG. 10A but based on a horizontal text line shift.

In one or more embodiments, the merged text object generation system 106 determines font character properties that reflect the point text character properties associated with the vertical digital text and modifies the font character properties of the vertical merged digital point text object 1504 accordingly. Further, the merged text object generation system 106 can determine point text paragraph properties of the vertical merged digital point text object 1504, such as paragraph groupings and alignment and/or justification values associated with the paragraphs as discussed above with reference to FIG. 13.

As shown in FIG. 15, the merged text object generation system 106 generates the vertical area text object 1506 based on the vertical merged digital point text object 1504. Indeed, the vertical area text object 1506 includes the vertical digital text and a set of font character properties that reflect the point text character properties. Further, the vertical area text object 1506 can include font paragraph properties that reflect the point text paragraph properties. In one or more embodiments, the merged text object generation system 106 simplifies the font character properties of the vertical area text object 1506 by, for example, modifying text spacing using one or more text tracking values, as discussed above with reference to FIG. 14.

By generating vertical digital text objects that include digital text and the font character properties as discussed above, the merged text object generation system 106 can operate more flexibly than conventional systems. Indeed, the merged text object generation system 106 can generate vertical merged digital text objects (e.g., a vertical merged digital point text object or a vertical area text object), which could not be effectively accomplished by many conventional systems.

As mentioned above, in one or more embodiments, the merged text object generation system 106 utilizes a user interface displayed on a computing device (e.g., a client device) for displaying digital text within a plurality of digital point text objects, area text objects, etc. The merged text object generation system 106 can generate an area text object based on a plurality of digital point text objects selected via the user interface. FIGS. 16A-16C illustrate a user interface used by the merged text object generation system 106 in accordance with one or more embodiments.

As shown in FIG. 16A, the merged text object generation system 106 displays digital text (e.g., from an imported digital document) via the user interface 1602. In particular, the merged text object generation system 106 displays the digital text within a plurality of digital point text objects 1604. Further, the merged text object generation system 106 detects a user selection of the plurality of digital point text objects 1604 (e.g., represented by the selection box 1606 generated using the cursor 1608.

As shown in FIG. 16B, the merged text object generation system 106 detects, via the user interface 1602, a user selection of a selectable option 1610 to generate an area text object based on the plurality of digital point text objects 1604 that were previously selected. Indeed, through the user interface 1602, the merged text object generation system 106 can provide a user with a plurality of options. The merged text object generation system 106 can enable the user to navigate the various options to select the selectable option 1610 to generate the area text object.

As shown in FIG. 16C, in response to detecting the user select the selectable option 1610 to generate an area text object, the merged text object generation system 106 generates the area text object 1612 (shown within an area text boundary box). Indeed, the merged text object generation system 106 can generate the area text object 1612 based on the plurality of digital point text objects 1606 as discussed above.

Accordingly, by using a user interface, the merged text object generation system 106 can operate more efficiently than conventional systems. For example, by allowing a user to merely select a plurality of digital point text objects and select an option to convert the digital point text objects to an area text object, the merged text object generation system 106 reduces the number of steps required by a user to recreate an area text object of imported digital text.

Figure 17:
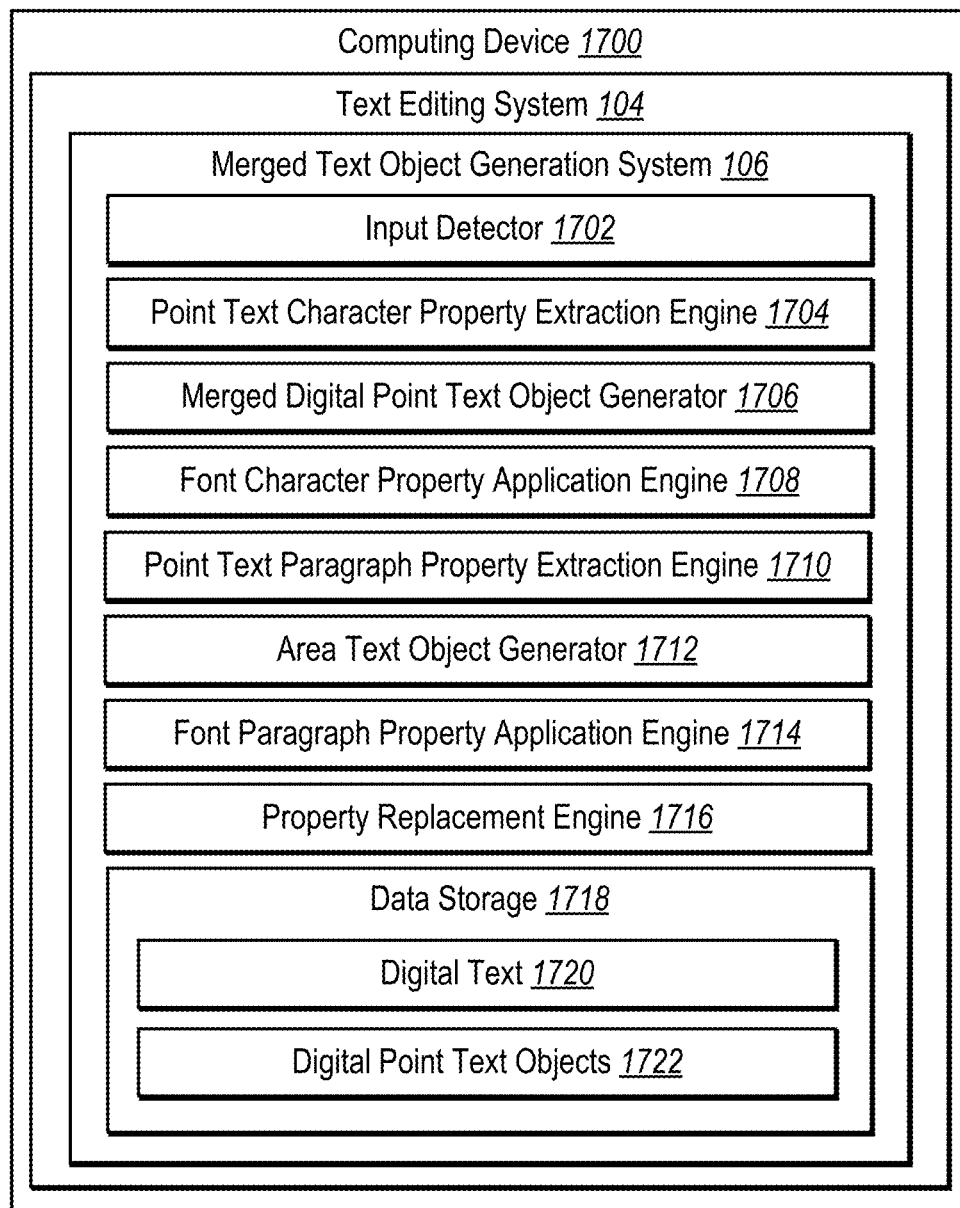
FIG. 17 illustrates an example an example schematic diagram of a merged digital text object generation system in accordance with one or more embodiments.

Turning now to FIG. 17, additional detail will be provided regarding various components and capabilities of the merged text object generation system 106. In particular, FIG. 17 illustrates the merged text object generation system 106 implemented by the computing device 1700 (e.g., the server(s) 102 and/or one of the client devices 110a-110n as discussed above with reference to FIG. 1). Additionally, the merged text object generation system 106 is also part of the text editing system 104. As shown, the merged text object generation system 106 can include, but is not limited to, an input detector 1702, a point text character property extraction engine 1704, a merged digital point text object generator 1706, a font character property application engine 1708, a point text paragraph property extraction engine 1710, an area text object generator 1712, a font paragraph property application engine 1714, a property replacement engine 1716, and data storage 1718 (which includes digital text 1720 and digital point text objects 1722).

As just mentioned, and as illustrated in FIG. 17, the merged text object generation system 106 includes the input detector 1702. In particular, the input detector 1702 can detect user input provided via the computing device 1700. For example, the input detector 1702 can detect a user selection of digital point text objects included in an imported digital document for conversion to an area text object.

Additionally, as shown in FIG. 17, the merged text object generation system 106 includes the point text character property extraction engine 1704. In particular, the point text character property extraction engine 1704 can determine or otherwise identify point text character properties associated with digital text represented in a plurality of digital point text objects, such as the digital point text objects included in the user selection detected by the input detector 1702. For example, the point text character property extraction engine 1704 can determine a baseline shift associated with a digital point text object, a point text rotation associated with a digital point text object (and a baseline shift to match the point text rotation), a point text spacing between digital point text objects, a text line indent associated with a digital point text object, an indication that a digital point text object corresponds to the beginning of a new text line, and a vertical shift associated with a text line.

Further, as shown in FIG. 17, the merged text object generation system 106 includes the merged digital point text object generator 1706. In particular, the merged digital point text object generator 1706 can generate a merged digital point text object based on a plurality of digital point text objects. For example, in one or more embodiments, the merged digital point text object generator 1706 merges the plurality of digital point text objects to generate a merged digital point text object.

As shown in FIG. 17, the merged text object generation system 106 also includes the font character property application engine 1708. In particular, the font character property application engine 1708 can modify font character properties of a merged digital point text object to reflect the point text character properties determined by the point text character property extraction engine 1704. For example, the font character property application engine 1708 can apply a vertical shift to a digital character or a text line, a character rotation, a text spacing, an indentation, or a new line character.

As shown in FIG. 17, the merged text object generation system 106 further includes the point text paragraph property extraction engine 1710. In particular, the point text paragraph property extraction engine 1710 can determine point text paragraph properties associated with the digital text of a merged digital point text object. For example, the point text paragraph property extraction engine 1710 can identify text lines that are part of the same paragraphs or an alignment or justification property associated with a particular paragraph.

Further, as shown in FIG. 17, the merged text object generation system 106 includes the area text object generator 1712. In particular, the area text object generator 1712 can generate an area text object based on a merged digital point text object. For example, area text object generator 1712 can generate an area text boundary box based on the boundaries of a plurality of digital point text objects (e.g., those digital point text objects upon which the merged digital point text object is based) and provide, within the area text boundary box, the digital text represented in the plurality of digital point text objects. Further, the area text object generator 1712 can provide, within the area text boundary box, a set of font character properties that reflect the point text character properties associated with the plurality of digital point text objects.

Additionally, as shown in FIG. 17, the merged text object generation system 106 includes the font paragraph property application engine 1714. In particular, the font paragraph property application engine 1714 can modify font paragraph properties of an area text object to reflect point text paragraph properties determined by the point text paragraph property extraction engine 1710. For example, the font paragraph property application engine 1714 can provide, within an area text object, digital text grouped into one or more paragraphs. Further the font paragraph property application engine 1714 can apply an alignment property or a justification property to one or more of the paragraphs within the area text object.

As shown in FIG. 17, the merged text object generation system 106 further includes the property replacement engine 1716. In particular, the property replacement engine 1716 can replace one or more font character properties and/or font paragraph properties within an area text object. For example, can determine that a text spacing of the font character properties of the digital text is consistent between digital characters in a text line, the text spacing consisting of one or more tab values or kerning values. Accordingly, the property replacement engine 1716 can modify the text spacing within the text line by replacing the one or more tab values or kerning values with a text tracking value.

Additionally, as shown in FIG. 17, the merged text object generation system 106 includes data storage 1718. In particular, data storage 1718 includes digital text 1720 and digital point text objects 1722. Digital text 1720 can store the digital text (e.g., raw text data) included in a digital document, such as a previously-generated digital document that has been imported. Digital point text objects 1722 can store digital point text objects generated upon importing a digital document. The stored digital point text objects can include the digital text stored in digital text 1720.

Each of the components 1702-1722 of the merged text object generation system 106 can include software, hardware, or both. For example, the components 1702-1722 can include one or more instructions stored on a computer-readable storage medium and executable by processors of one or more computing devices, such as a client device or server device. When executed by the one or more processors, the computer-executable instructions of the merged text object generation system 106 can cause the computing device(s) to perform the methods described herein. Alternatively, the components 1702-1722 can include hardware, such as a special-purpose processing device to perform a certain function or group of functions. Alternatively, the components 1702-1722 of the merged text object generation system 106 can include a combination of computer-executable instructions and hardware.

Furthermore, the components 1702-1722 of the merged text object generation system 106 may, for example, be implemented as one or more operating systems, as one or more stand-alone applications, as one or more modules of an application, as one or more plug-ins, as one or more library functions or functions that may be called by other applications, and/or as a cloud-computing model. Thus, the components 1702-1722 of the merged text object generation system 106 may be implemented as a stand-alone application, such as a desktop or mobile application. Furthermore, the components 1702-1722 of the merged text object generation system 106 may be implemented as one or more web-based applications hosted on a remote server. Alternatively, or additionally, the components 1702-1722 of the merged text object generation system 106 may be implemented in a suite of mobile device applications or "apps." For example, in one or more embodiments, the merged text object generation system 106 can comprise or operate in connection with digital software applications such as ADOBE® ILLUSTRATOR® or ADOBE® INDESIGN® PLAYER. "ADOBE," "ILLUSTRATOR," and "INDESIGN" are either registered trademarks or trademarks of Adobe Inc. in the United States and/or other countries.

FIGS. 1-17, the corresponding text and the examples provide a number of different methods, systems, devices, and non-transitory computer-readable media of the merged text object generation system 106. In addition to the foregoing, one or more embodiments can also be described in terms of flowcharts comprising acts for accomplishing the particular results, as shown in FIG. 18. FIG. 18 may be performed with more or fewer acts. Further, the acts may be performed in different orders. Additionally, the acts described herein may be repeated or performed in parallel with one another or in parallel with different instances of the same or similar acts.

Figure 18:
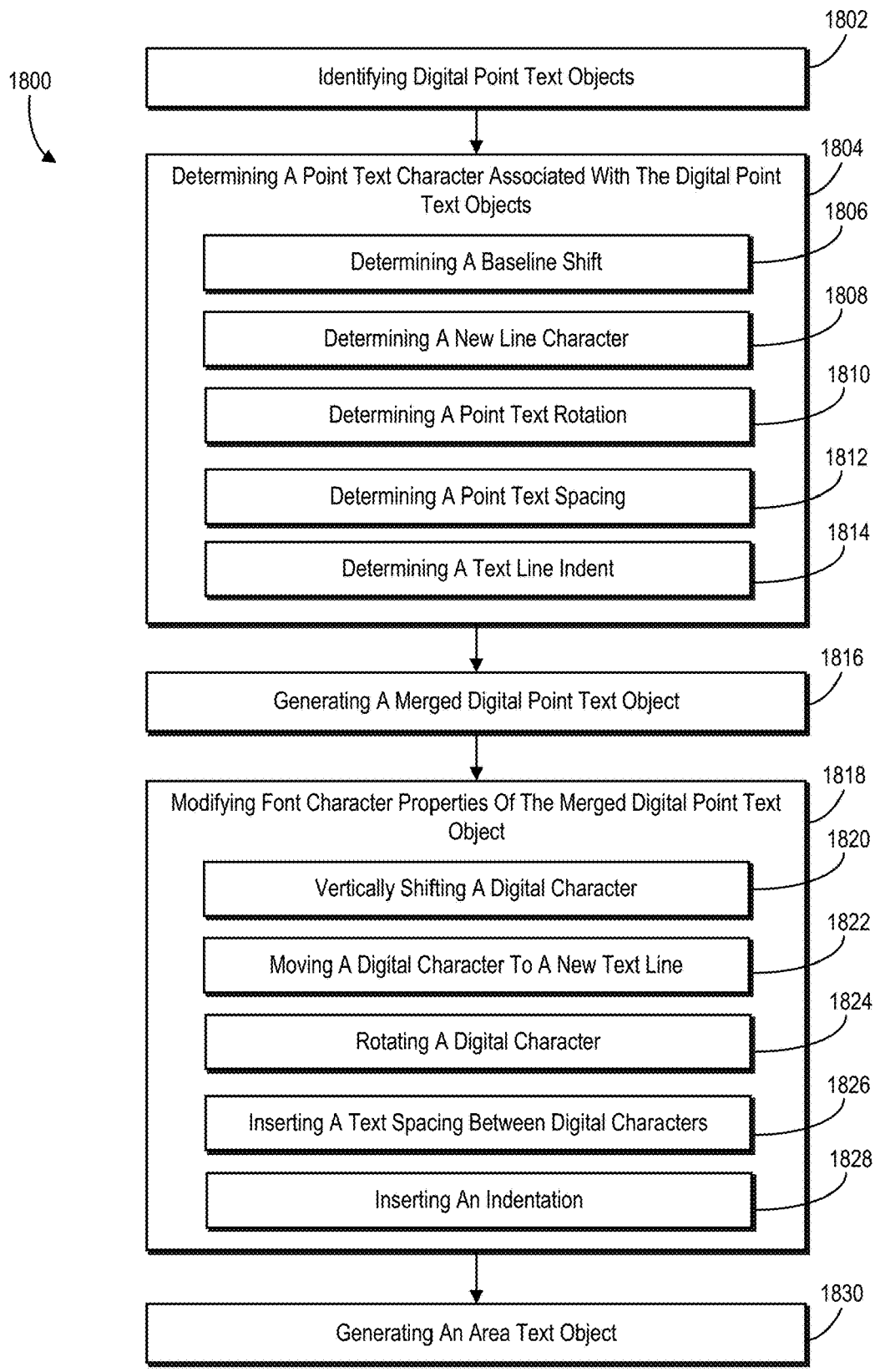
FIG. 18 illustrates a flowchart for a series of acts for generating an area text object based on a plurality of digital point text objects in accordance with one or more embodiments.

As mentioned, FIG. 18 illustrates a flowchart of a series of acts 1800 for generating an area text object based on a plurality of digital point text objects in accordance with one or more embodiments. While FIG. 18 illustrates acts according to one embodiment, alternative embodiments may omit, add to, reorder and/or modify any of the acts shown in FIG. 18. The acts of FIG. 18 can be performed as part of a method. For example, in some embodiments, the acts of FIG. 18 can be performed, in a digital medium environment for importing previously-generated digital text into a digital text application, as part of a computer-implemented method for modifying digital text objects. Alternatively, a non-transitory computer-readable medium can store instructions thereon that, when executed by at least one processor, cause a computing device to perform the acts of FIG. 18. In some embodiments, a system can perform the acts of FIG. 18. For example, in one or more embodiments, a system includes one or more memory devices comprising a digital document comprising a plurality of digital point text objects and digital text (e.g., vertical digital text) represented in the plurality of digital point text objects. The system can further include one or more computer devices configured to cause the system to perform the acts of FIG. 18.

The series of acts 1800 includes an act 1802 of identifying digital point text objects. For example, the act 1802 involves identifying a user selection of a plurality of digital point text objects in a digital document. In one or more embodiments, the digital point text objects include digital text from a digital document, such as an imported digital document.

The series of acts 1800 also includes an act 1804 of determining point text character properties associated with the digital point text objects. For example, the act 1804 involves determining point text character properties associated with digital text represented in the plurality of digital point text objects.

As shown in FIG. 18, the act 1804 includes the sub-act 1806 of determining a baseline shift. Indeed, in one or more embodiments, the merged text object generation system 106 determines the point text character properties associated with the digital text by determining a baseline shift associated with a digital point text object of the plurality of digital point text objects. For example, the merged text object generation system 106 can determine the baseline shift by identifying, for a text line associated with the digital point text object, an initial digital point text object of the text line; based on a baseline of the initial digital point text object, determining a reference baseline of the text line; and identifying a vertical shift of a baseline of the digital point text object from the reference baseline, the baseline shift associated with the digital point text object comprising the vertical shift.

As shown in FIG. 18, the act 1804 further includes the sub-act 1808 of determining a new line character. Indeed, in one or more embodiments, the merged text object generation system 106 determines the point text character properties associated with the digital text by identifying a new line character associated with a digital point text object. In one or more embodiments, the merged text object generation system 106 determines that a new line character is associated with a digital point text object by determining that a vertical shift of the digital point text object is greater than a baseline tolerance threshold associated with a text line that includes the previous digital point text object.

Further, as shown in FIG. 18, the act 1804 includes the sub-act 1810 of determining a point text rotation. Indeed, in one or more embodiments, the point text character properties associated with the digital text comprise a point text rotation of a digital point text object of the plurality of digital point text objects. The merged text object generation system 106 can generate a duplicate point text object corresponding to the digital point text object and modify a font character property of the duplicate point text object to rotate a digital character of the duplicate point text object based on the point text rotation of the digital point text object. In one or more embodiments, the merged text object generation system 106 identifies a rotation value of the point text rotation associated with the digital point text object using a table of predefined rotation values.

In one or more embodiments, the merged text object generation system 106 further determines a baseline shift to match the point text rotation of the digital point text object. For example, the merged text object generation system 106 determines a left point of the digital character of the duplicate point text object. The merged text object generation system 106 compares the left point of the digital character of the duplicate point text object to a translation-based anchor point of the digital point text object to determine a vertical shift of the translation-based anchor point of the digital point text object from a reference baseline associated with the digital point text object.

Additionally, as shown in FIG. 18, the act 1804 includes the sub-act 1812 of determining a point text spacing. Indeed, in one or more embodiments, the merged text object generation system 106 determines the point text character properties associated with the digital text by determining a point text spacing between a first digital point text object of a text line of the digital text and a second digital point text object that follows the first digital point text object in the text line. For example, the merged text object generation system 106 can determine a right position of the first digital point text object based on an origin of a final digital character of the first digital point text object; determine a left position of the second digital point text object based on an origin of an initial digital character of the second digital point text object; and determine a spacing distance between the right position of the first digital point text object and the left position of the second digital point text object, the point text spacing comprising the spacing distance.

As shown in FIG. 18, the act 1804 further includes the sub-act 1814 of determining a text line indent. Indeed, in one or more embodiments, the merged text object generation system 106 determines the point text character properties associated with the digital text by determining a text line indent associated with a text line of the digital text. In one or more embodiments, the merged text object generation system 106 determines the text line indent by identifying a left-most digital point text object of the plurality of digital point text objects, wherein the left-most digital point text object is associated with an additional text line of the digital text; and determining the text line indent associated with the text line of the digital text based on a comparison of a horizontal position of an initial digital point text object of the text line and a horizontal position of the left-most digital point text object.

In one or more embodiments, the merged text object generation system 106 employs the sub-acts 1806, 1808, 1810, 1812, and 1814 as alternative acts. In some embodiments, however, the merged text object generation system 106 employs one or more of the sub-acts 1806, 1808, 1810, 1812, and 1814 together or in a sequence.

Further, the series of acts 1800 includes an act 1816 of generating a merged digital point text object. For example, the act 1816 involves merging the plurality of digital point text objects to generate a merged digital point text object. In one or more embodiments, the merged digital point text object comprises the digital text. In some embodiments, the merged text object generation system 106 determines that a text spacing of the modified font character properties of the merged digital point text object (discussed below) is consistent between digital characters in a text line of the digital text of the merged digital point text object, the text spacing consisting of one or more tab values or kerning values; and modifies the text spacing within the text line by replacing the one or more tab values or kerning values with a text tracking value.

Additionally, the series of acts 1800 includes an act 1818 of modifying font character properties of the merged digital point text object. For example, the act 1818 involves modifying font character properties of the merged digital point text object to reflect the point text character properties.

As shown in FIG. 18, the act 1818 includes the sub-act 1820 of vertically shifting a digital character. Indeed, in one or more embodiments, the merged text object generation system 106 modifies the font character properties of the merged digital point text object by vertically shifting a digital character within the merged digital point text object to reflect a baseline shift associated with a digital point text object that includes the digital character.

Further, as shown in FIG. 18, the act 1818 includes the sub-act 1822 of moving a digital character to a new text line. Indeed, in one or more embodiments, the merged text object generation system 106 modifies the font character properties of the merged digital point text object by moving a digital character to a new text line within the merged digital point text object to reflect a new line character associated a digital point text object that includes the digital character.

As shown in FIG. 18, the act 1818 further includes the sub-act 1824 of rotating a digital character. Indeed, in one or more embodiments, the merged text object generation system 106 modifies the font character properties of the merged digital point text object by modifying a digital character based on a character rotation that reflects a point text rotation associated with a digital pint text object that includes the digital character. For example, the merged text object generation system 106 can rotate the digital character to match the rotation of the digital point text object. In one or more embodiments, the merged text object generation system 106 can further vertically shift the digital character to reflect a baseline shift of the digital point text object that matches the point text rotation of the digital point text object.

Additionally, as shown in FIG. 18, the act 1818 includes the sub-act 1826 of inserting a text spacing between digital characters. Indeed, in one or more embodiments, the merged text object generation system 106 modifies the font character properties of the merged digital point text object to reflect the point text character properties by generating, within the merged digital point text object, a text spacing between digital characters to reflect a point text spacing between digital point text objects that include those digital characters. As an illustration, where a plurality of digital point text objects includes a first digital point text object and a second digital point text object, the merged text object generation system 106 can generate a text spacing between the final digital character of the first digital point text object and the initial digital character of the second digital point text object to reflect the point text spacing, the text spacing comprising one or more tab values or kerning values.

As shown in FIG. 18, the act 1818 also includes the sub-act 1828 of inserting an indentation. Indeed, in one or more embodiments, the merged text object generation system 106 modifies the font character properties of the merged digital point text object by inserting an indentation before a digital character to reflect a text line indent associated with a digital point text object that includes that digital character.

In one or more embodiments, the merged text object generation system 106 employs the sub-acts 1820, 1822, 1824, 1826, and 1828 as alternative acts. In some embodiments, however, the merged text object generation system 106 employs one or more of the sub-acts 1820, 1822, 1824, 1826, and 1828 together or in a sequence.

The series of acts 1800 further includes an act 1830 of generating an area text object. For example, the act 1830 involves generating, based on the merged digital point text object, an area text object comprising the digital text and a set of font character properties reflecting the point text character properties. In other words, the merged text object generation system 106 can generate an area text object based on the merged digital point text object, wherein the area text object comprises the digital text and the font character properties that reflect the point text character properties. In one or more embodiments, generating the area text object comprises generating an area text boundary box for the area text object based on boundaries of the plurality of digital point text objects; determining point text paragraph properties associated with the digital text of the merged digital point text object; and providing, within the area text boundary box, text lines of the digital text grouped into a plurality of paragraphs based on the point text paragraph properties associated with the digital text.

To provide an illustration of implementing the series of acts 1800, in one or more embodiments, the merged text object generation system 106 identifies digital text represented in a plurality of digital point text objects of a digital document, wherein the digital text comprises a first digital character represented in a first digital point text object and a second digital character represented in a second digital point text object; determines point text character properties associated with the digital text by determining a first point text rotation associated with the first digital point text object and a second point text rotation associated with the second digital point text object; determines font character properties that reflect the point text character properties by determining a first character rotation that corresponds to the first point text rotation and a second character rotation that corresponds to the second point text rotation; merges the plurality of digital point text objects to generate a merged digital point text object comprising the digital text; and modify the digital text of the merged digital point text object based on the font character properties by modifies the first digital character based on the first character rotation and modifying the second digital character based on the second character rotation.

In some embodiments, the merged text object generation system 106 determines the point text character properties associated with the digital text by determining a baseline shift associated with a third digital point text object of the plurality of digital point text objects, the third digital point text object comprising a third digital character; and modifies the digital text of the merged digital point text object based on the font character properties by vertically shifting the third digital character within the merged digital point text object based on the baseline shift.

In further embodiments, the merged text object generation system 106 determines the point text character properties associated with the digital text by determining a point text spacing between a third digital point text object of a text line of the digital text and a fourth digital point text object that follows the third digital point text object in the text line based on a right position of the third digital point text object and a left position of the fourth digital point text object; and modifies the digital text of the merged digital point text object based on the font character properties by inserting, within the digital text of the merged digital point text object, a text spacing between a final digital character of the third digital point text object and an initial digital character of the fourth digital point text object.

In one or more embodiments, the series of acts 1800 further includes acts for receiving and implementing user edits within the area text object. For example, in one or more embodiments, the acts include receiving user edits associated with a first paragraph of the digital text of the area text object (the first paragraph being from a plurality of paragraphs of the digital text within the area text object); and based on the user edits, modifying the first paragraph while maintaining a visual appearance of other paragraphs of the digital text of the area text object (i.e., maintaining a visual appearance of other paragraphs from the plurality of paragraphs).

In one or more embodiments, the digital text comprises vertical digital text. Accordingly, the series of acts 1800 can include acts for generating vertical merged digital text objects that include vertical digital text. For example, in one or more embodiments, the acts include analyzing vertical digital text represented in a plurality of digital point text objects of a digital document to determine point text character properties associated with the vertical digital text; determine font character properties that reflect the point text character properties associated with the vertical digital text; and generate, by merging the plurality of digital point text objects, a vertical merged digital text object comprising the vertical digital text and the font character properties that reflect the point text character properties. In one or more embodiments, the vertical merged digital text object comprises a vertical area text object.

As an illustration, the merged text object generation system 106 can determine the point text character properties associated with the vertical digital text by determining a point text rotation of a digital point text object of the plurality of digital point text objects, the digital point text object comprising a digital character; and modify the font character properties to reflect the point text character properties by rotating the digital character within the vertical merged digital text object based on the point text rotation of the digital point text object. As another example, the merged text object generation system 106 can determine that a text spacing of the font character properties of the vertical merged digital text object is consistent between digital characters in a text line of the vertical digital text of the vertical merged digital text object, the text spacing consisting of one or more tab values or kerning values; and modify the text spacing within the text line by replacing the one or more tab values or kerning values with a text tracking value.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multiprocessor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 19:
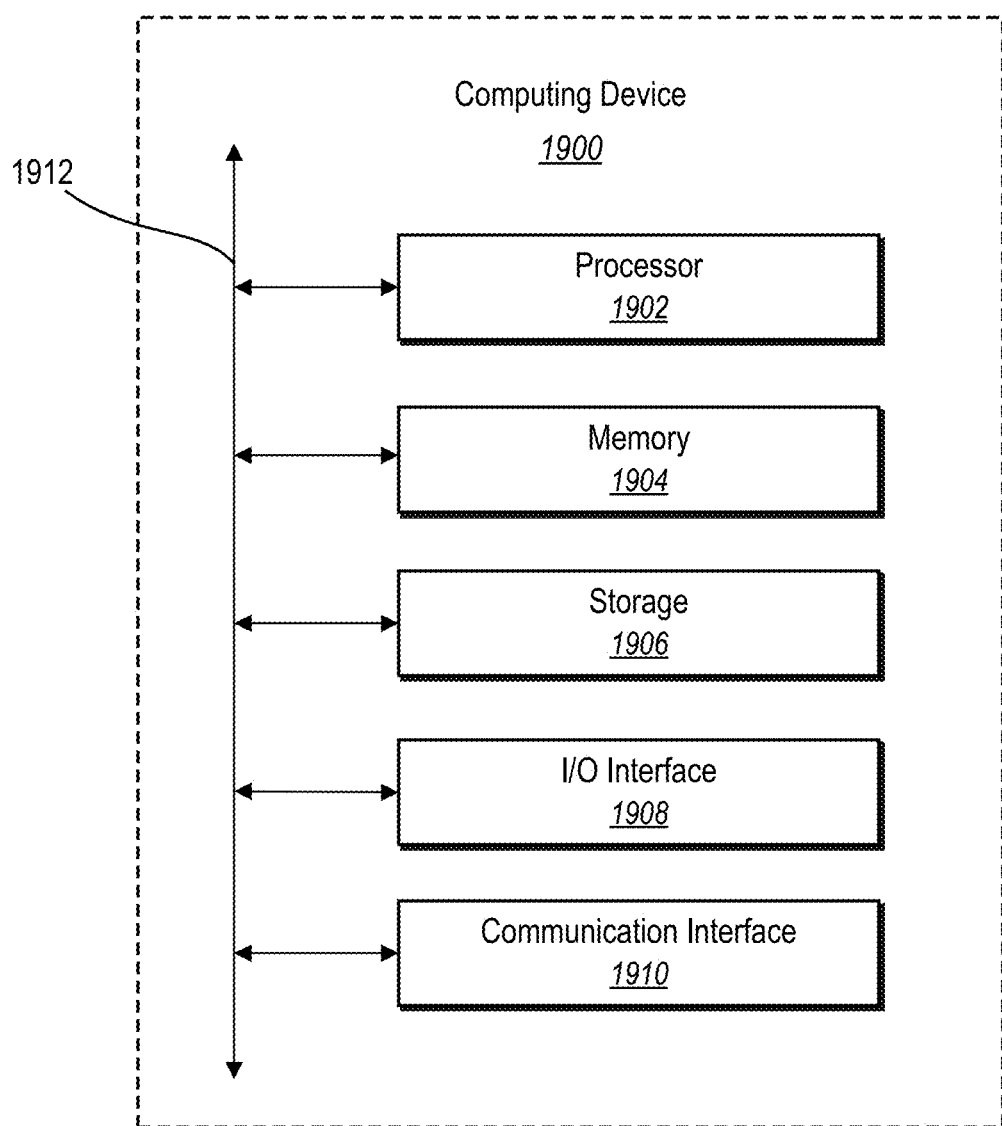
FIG. 19 illustrate a block diagram of an exemplary computing device in accordance with one or more embodiments.

FIG. 19 illustrates a block diagram of an example computing device 1900 that may be configured to perform one or more of the processes described above. One will appreciate that one or more computing devices, such as the computing device 1900 may represent the computing devices described above (e.g., the server(s) 102 and/or the client devices 110a-110n). In one or more embodiments, the computing device 1900 may be a mobile device (e.g., a mobile telephone, a smartphone, a PDA, a tablet, a laptop, a camera, a tracker, a watch, a wearable device, etc.). In some embodiments, the computing device 1900 may be a non-mobile device (e.g., a desktop computer or another type of client device). Further, the computing device 1900 may be a server device that includes cloud-based processing and storage capabilities.

As shown in FIG. 19, the computing device 1900 can include one or more processor(s) 1902, memory 1904, a storage device 1906, input/output interfaces 1908 (or "I/O interfaces 1908"), and a communication interface 1910, which may be communicatively coupled by way of a communication infrastructure (e.g., bus 1912). While the computing device 1900 is shown in FIG. 19, the components illustrated in FIG. 19 are not intended to be limiting. Additional or alternative components may be used in other embodiments. Furthermore, in certain embodiments, the computing device 1900 includes fewer components than those shown in FIG. 19. Components of the computing device 1900 shown in FIG. 19 will now be described in additional detail.

In particular embodiments, the processor(s) 1902 includes hardware for executing instructions, such as those making up a computer program. As an example, and not by way of limitation, to execute instructions, the processor(s) 1902 may retrieve (or fetch) the instructions from an internal register, an internal cache, memory 1904, or a storage device 1906 and decode and execute them.

The computing device 1900 includes memory 1904, which is coupled to the processor(s) 1902. The memory 1904 may be used for storing data, metadata, and programs for execution by the processor(s). The memory 1904 may include one or more of volatile and non-volatile memories, such as Random-Access Memory ("RAM"), Read-Only Memory ("ROM"), a solid-state disk ("SSD"), Flash, Phase Change Memory ("PCM"), or other types of data storage. The memory 1904 may be internal or distributed memory.

The computing device 1900 includes a storage device 1906 including storage for storing data or instructions. As an example, and not by way of limitation, the storage device 1906 can include a non-transitory storage medium described above. The storage device 1906 may include a hard disk drive (HDD), flash memory, a Universal Serial Bus (USB) drive or a combination these or other storage devices.

As shown, the computing device 1900 includes one or more I/O interfaces 1908, which are provided to allow a user to provide input to (such as user strokes), receive output from, and otherwise transfer data to and from the computing device 1900. These I/O interfaces 1908 may include a mouse, keypad or a keyboard, a touch screen, camera, optical scanner, network interface, modem, other known I/O devices or a combination of such I/O interfaces 1908. The touch screen may be activated with a stylus or a finger.

The I/O interfaces 1908 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interfaces 1908 are configured to provide graphical data to a display for presentation to a user. The graphical data may be representative of one or more graphical user interfaces and/or any other graphical content as may serve a particular implementation.

The computing device 1900 can further include a communication interface 1910. The communication interface 1910 can include hardware, software, or both. The communication interface 1910 provides one or more interfaces for communication (such as, for example, packet-based communication) between the computing device and one or more other computing devices or one or more networks. As an example, and not by way of limitation, communication interface 1910 may include a network interface controller (NIC) or network adapter for communicating with an Ethernet or other wire-based network or a wireless NIC (WNIC) or wireless adapter for communicating with a wireless network, such as a WI-FI. The computing device 1900 can further include a bus 1912. The bus 1912 can include hardware, software, or both that connects components of computing device 1900 to each other.

In the foregoing specification, the invention has been described with reference to specific example embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel to one another or in parallel to different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A computer-implemented method comprising:
    detecting a user selection of a plurality of digital point text objects in a digital document, wherein the plurality of digital point text objects comprises a plurality of unbounded digital text objects having point type;
    merging the plurality of digital point text objects to generate a merged digital point text object, wherein the merged digital point text object comprises a single digital text object having the point type of the plurality of digital point text objects; and
    generating, based on the merged digital point text object, an area text object comprising a bounded digital text object having area type that corresponds to the point type of the merged digital point text object, the area text object including an area defined by one or more boundaries that cause digital text within the area text object to wrap to a next line of the area upon reaching the one or more boundaries.

2. The computer-implemented method of claim 1, further comprising:
    determining point text character properties associated with digital text represented in the plurality of digital point text objects; and
    modifying font character properties of the merged digital point text object to reflect the point text character properties.

3. The computer-implemented method of claim 2, wherein generating the area text object having the area type that corresponds to the point type based on the merged digital point text object comprises generating the area text object to include the digital text of the plurality of digital point text objects represented as the area type within the area text object and a set of font character properties corresponding to the modified font character properties of the merged digital point text object.

4. The computer-implemented method of claim 3, wherein:
    determining the point text character properties associated with the digital text represented in the plurality of digital point text objects comprises:
        determining a first point text character property associated with a first digital character represented in a first digital point text object; and
        determining a second point text character property associated with a second digital character represented in a second digital point text object; and
    generating the area text object to include the digital text represented in the plurality of digital point text objects and the set of font character properties comprises generating the area text object to include the first digital character having a first font character property that reflects the first point text character property and the second digital character having a second font character property that reflects the second point text character property.

5. The computer-implemented method of claim 2, wherein determining the point text character properties associated with the digital text represented in the plurality of digital point text objects comprises determining that a digital point text object from the plurality of digital point text objects is associated with a baseline shift by:
    determining a reference baseline for the digital point text object using a baseline of an initial digital point text object from a text line that includes the digital point text object; and
    identifying a vertical shift of a baseline of the digital point text object from the reference baseline, the baseline shift associated with the digital point text object comprising the vertical shift.

6. The computer-implemented method of claim 1, wherein detecting the user selection of the plurality of digital point text objects in the digital document comprises detecting a selection of vertical digital text represented within the plurality of digital point text objects, the vertical digital text comprising a sequence of digital characters that flows vertically.

7. The computer-implemented method of claim 6, wherein:
    merging the plurality of digital point text objects to generate the merged digital point text object comprises merging the plurality of digital point text objects to generate a vertical merged digital point text object; and
    generating the area text object comprises generating a vertical area text object.

8. The computer-implemented method of claim 1, further comprising determining point text paragraph properties associated with digital text represented in the merged digital point text object, wherein generating the area text object comprises providing, within the area text object, text lines of the digital text grouped into a plurality of paragraphs based on the point text paragraph properties associated with the digital text.

9. The computer-implemented method of claim 8, further comprising:
receiving user input to modify one or more paragraphs of the plurality of paragraphs of the digital text within the area text object; and
based on the user input, modifying the one or more paragraphs within the area text object while preserving an overall layout of the digital text within the area text object.

10. The computer-implemented method of claim 1, wherein:
detecting the user selection of the plurality of digital point text objects in the digital document comprises detecting a selection of digital point text objects having digital text that follows a boundary having a non-rectangular path; and
merging the plurality of digital point text objects to generate the merged digital point text object comprises generating the merged digital point text object to include the digital text following the non-rectangular path of the boundary.

11. A non-transitory computer-readable medium storing executable instructions which, when executed by a processing device, cause the processing device to perform operations comprising:
detecting a user selection of digital text represented in a first digital point text object and a second digital point text object, wherein the first digital point text object and the second digital point text object each comprise an unbounded digital text object having point type, the first digital point text object comprises a first digital character associated with a first point text character property, and the second digital point text object comprises a second digital character associated with a second point text character property;
merging the first digital point text object and the second digital point text object to generate a merged digital point text object comprising the digital text, wherein the merged digital point text object comprises a single digital text object having the point type of the first digital point text object and the second digital point text object; and
generating, based on the merged digital point text object, an area text object comprising a bounded digital text object having area type that corresponds to the point type of the merged digital point text object, the area text object including an area defined by one or more boundaries that cause a portion of digital text within the area text object to wrap to a next line of the area upon reaching the one or more boundaries, the first digital character having a first font character property reflecting the first point text character property, and the second digital character having a second font character property reflecting the second point text character property.

12. The non-transitory computer-readable medium of claim 11, wherein the operations further comprise:
determining the first point text character property associated with the first digital character by determining a point text rotation associated with the first digital point text object; and
modifying the first digital character within the merged digital point text object to include first font character property by modifying the first digital character to include a character rotation that reflects the point text rotation.

13. The non-transitory computer-readable medium of claim 12, wherein the operations further comprise determining a baseline shift corresponding to the point text rotation associated with the first digital point text object by:
generating a duplicate point text object comprising a digital character that corresponds to the first digital character represented in the first digital point text object;
rotating the digital character to have a character rotation that corresponds to the point text rotation associated with the first digital point text object;
determining a translation-based anchor point for the first digital point text object utilizing a position of a left point of the digital character and a position of an anchor point of the duplicate point text object; and
determining a vertical shift between the translation-based anchor point and a reference baseline associated with the first digital point text object.

14. The non-transitory computer-readable medium of claim 11, wherein:
the operations further comprise providing, for display within a graphical user interface of a client device, the digital text represented in the first digital point text object and the second digital point text object; and
detecting the user selection of the digital text represented in the first digital point text object and the second digital point text object comprises detecting the user selection of the digital text via the graphical user interface.

15. The non-transitory computer-readable medium of claim 14, wherein:
the operations further comprise providing a selectable option for generating the area text object within the graphical user interface; and
generating the merged digital point text object and the area text object comprises generating the merged digital point text object and the area text object in response to detecting a selection of the selectable option via the graphical user interface.

16. A system comprising:
at least one memory device comprising a digital document that includes digital text represented in a plurality of digital point text objects, the plurality of digital point text objects comprising a plurality of unbounded digital text objects having point type; and
at least one processor configured to cause the system to:
analyze the digital text from the plurality of digital point text objects of the digital document to determine point text character properties associated with the digital text;
determine font character properties that reflect the point text character properties associated with the digital text;
generate, by merging the plurality of digital point text objects, a merged digital point text object comprising the digital text and the font character properties, wherein the merged digital point text object comprises a single digital text object having the point type of the plurality of digital point text objects; and generate, based on the merged digital point text object, an area text object comprising the digital text and the font character properties, wherein the area text object comprises a bounded digital text object having area type and including an area defined by one or more boundaries that cause a portion of digital text within the area text object to wrap to a next line of the area upon reaching the one or more boundaries.

17. The system of claim 16, wherein the at least one processor is configured to cause the system to:

analyze the digital text from the plurality of digital point text objects of the digital document to determine the point text character properties associated with the digital text by analyzing vertical digital text represented in the plurality of digital point text objects to determine the point text character properties associated with the vertical digital text; and generate the area text object comprising the digital text by generating a vertical area text object comprising the vertical digital text.

18. The system of claim 16, wherein the at least one processor is configured to cause the system to:

analyze the digital text from the plurality of digital point text objects of the digital document to determine the point text character properties associated with the digital text by analyzing the digital text to determine a plurality of point text rotations associated with a plurality of digital characters represented in different digital point text objects; and determine the font character properties that reflect the point text character properties associated with the digital text by determining a plurality of character rotations, each character rotation corresponding to a point text rotation from the plurality of point text rotations.

19. The system of claim 16, wherein:

the at least one processor is further configured to cause the system to detect a user selection of the digital text via a graphical interface of a client device; and the at least one processor is configured to cause the system to analyze the digital text in response to detecting the user selection.

20. The system of claim 16, wherein:

the at least one processor is configured to cause the system to generate the area text object comprising the digital text by generating the area text object having text lines of the digital text grouped into a plurality of paragraphs; and the at least one processor is further configured to cause the system to modify at least one paragraph from the plurality of paragraphs within the area text object while preserving an overall layout of other paragraphs from the plurality of paragraphs within the area text object.

* * * * *